Aug. 26, 1924.

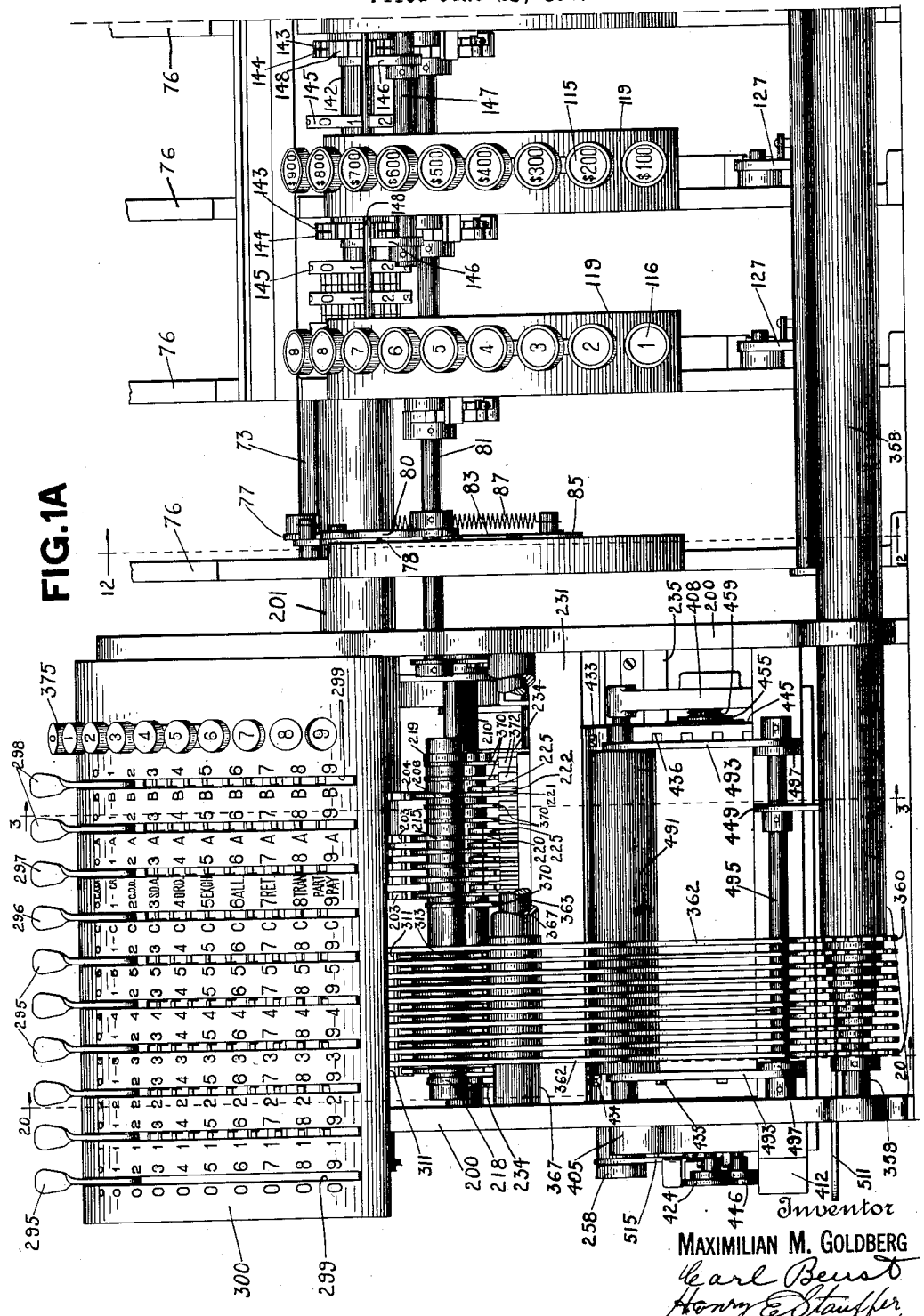

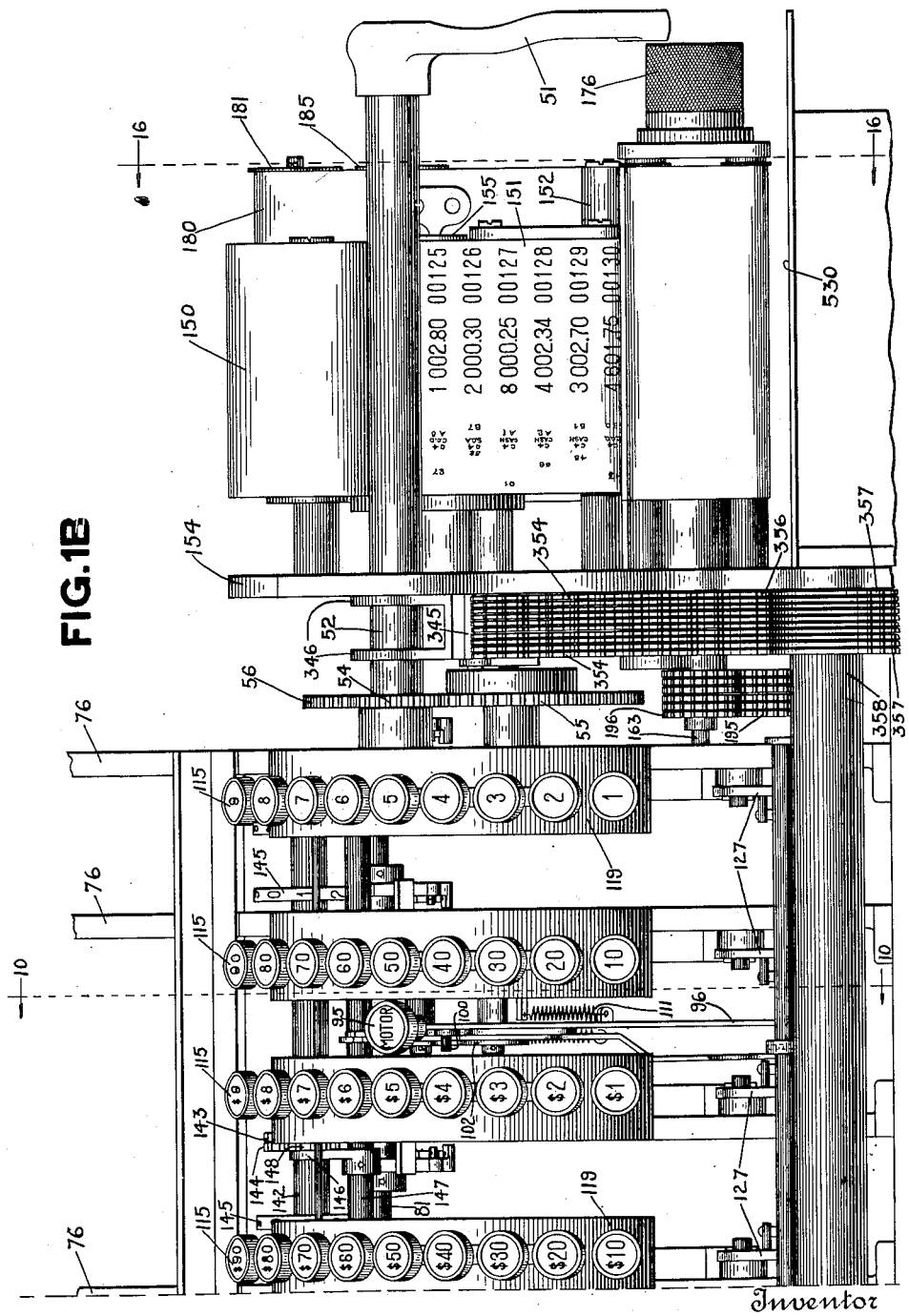

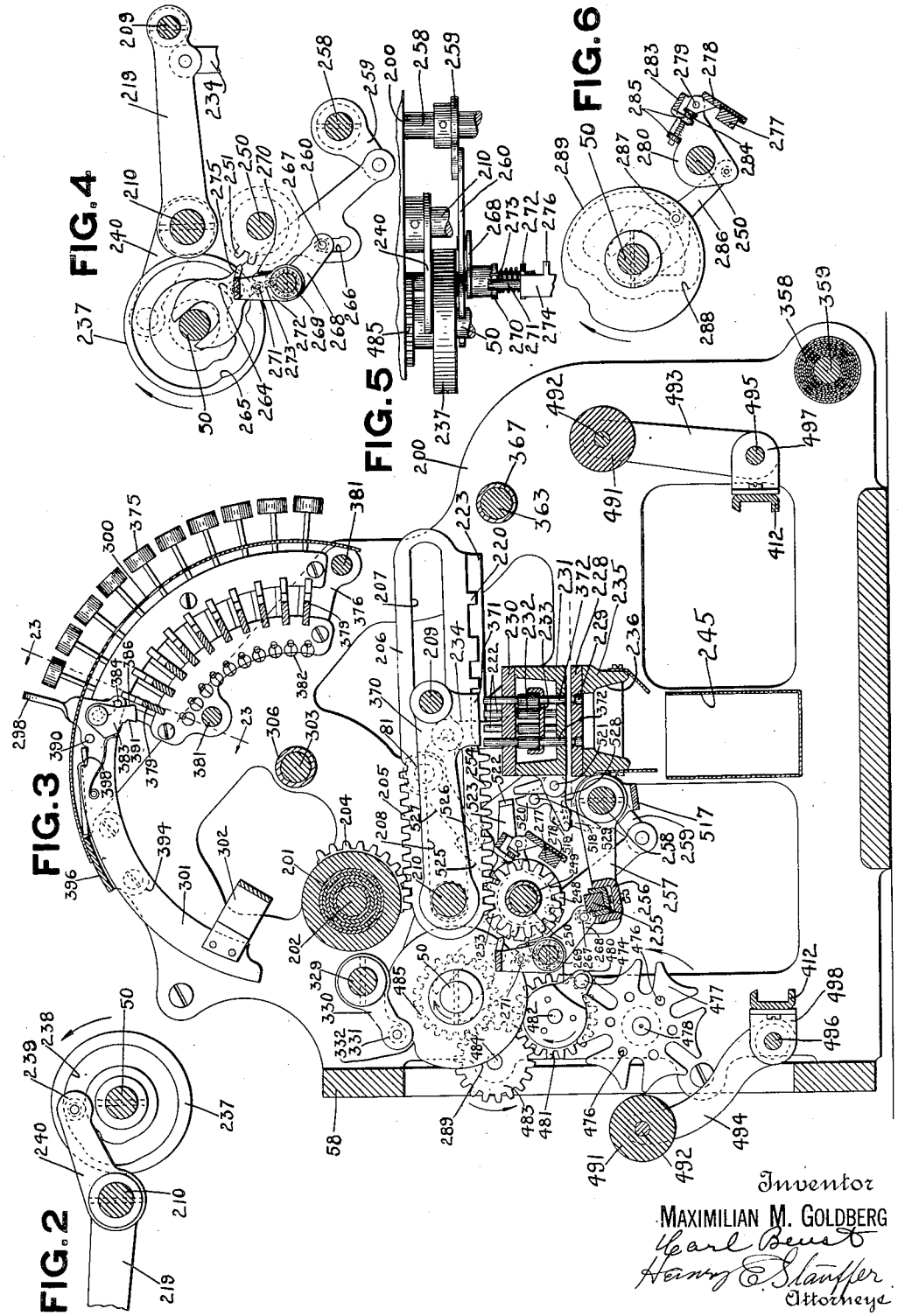

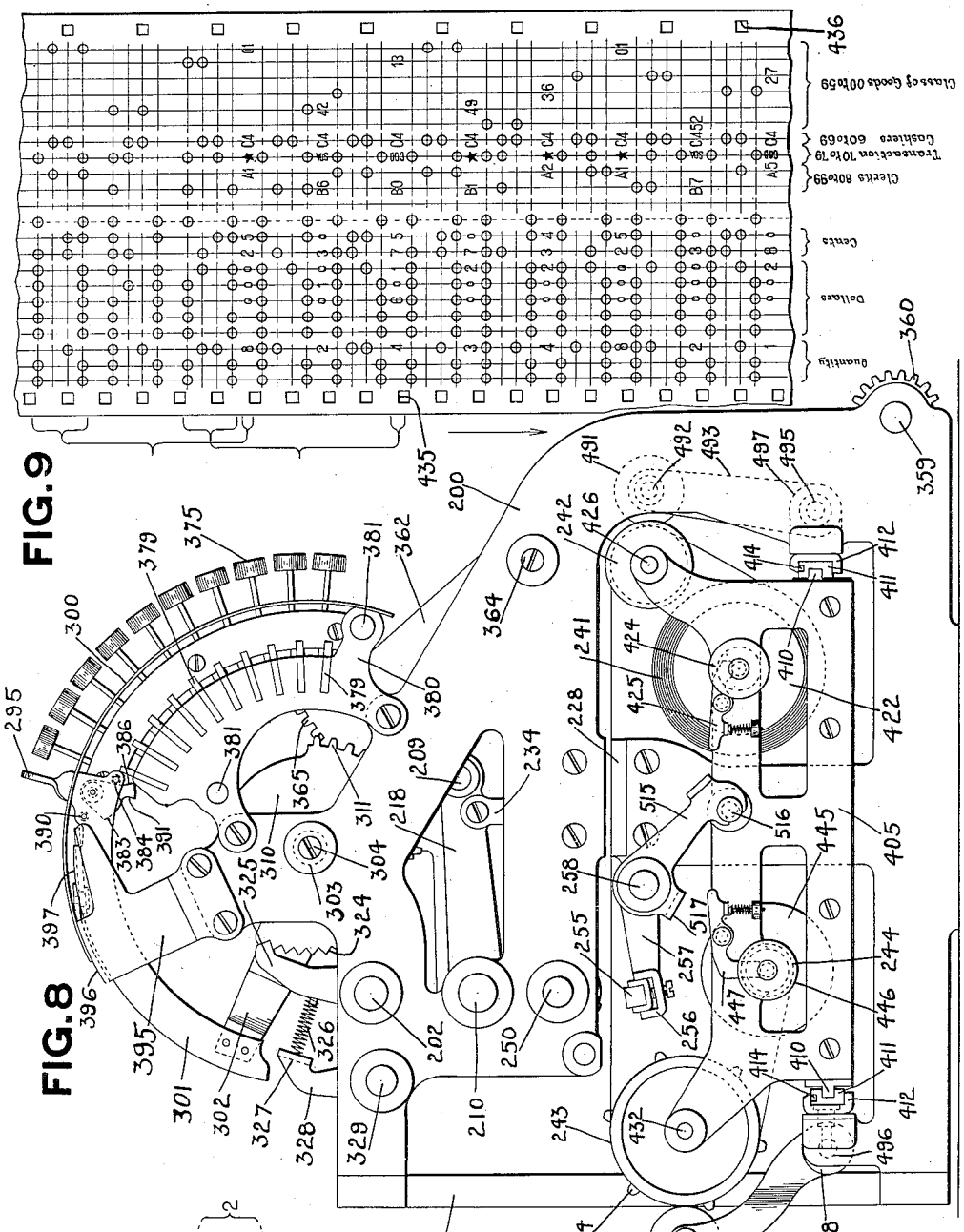

M. M. GOLDBERG 1,506,056

CASH REGISTER

Filed June 21, 1920   10 Sheets-Sheet 5

Inventor
MAXIMILIAN M. GOLDBERG
Carl Beust
Henry E. Stauffer
Attorneys

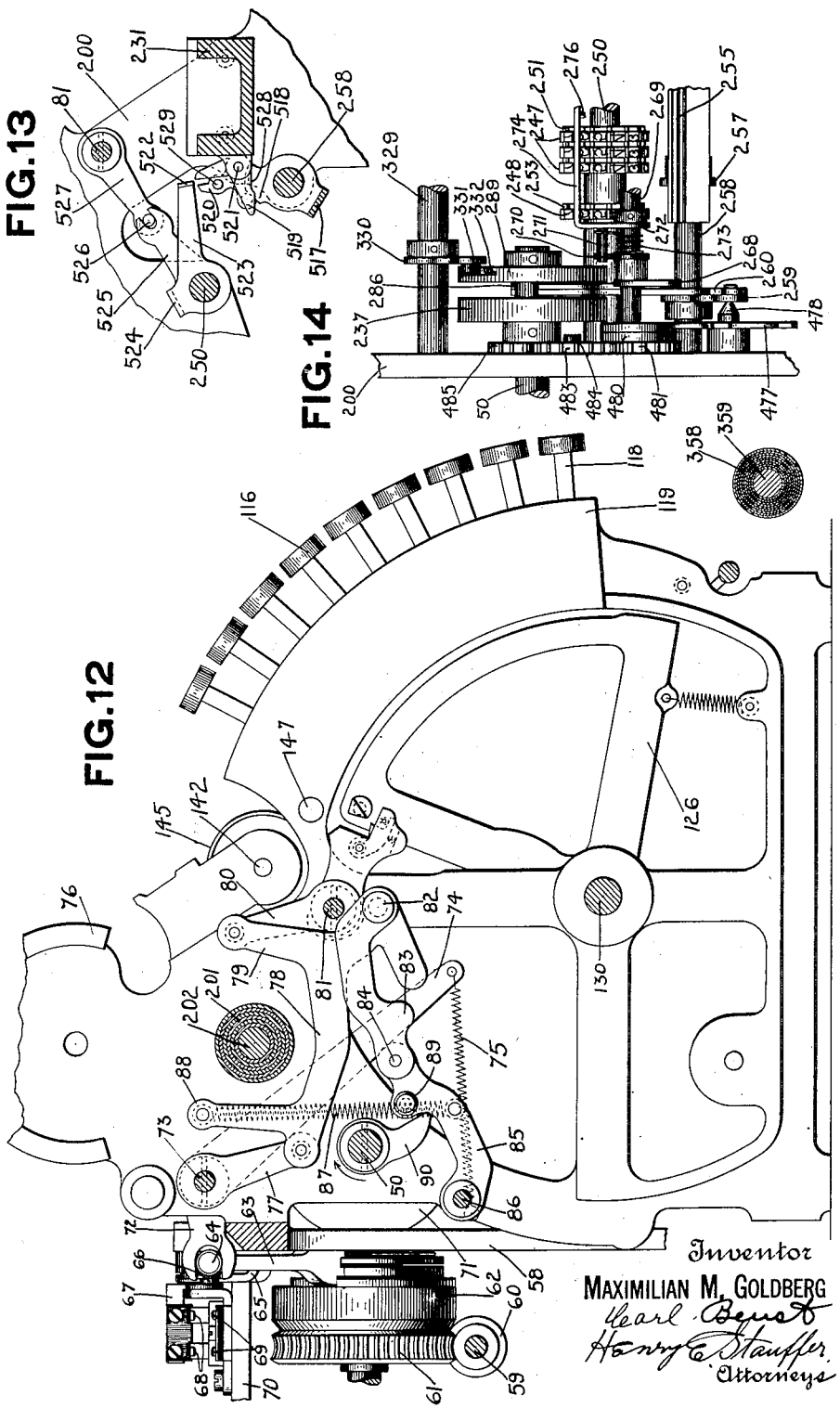

Aug. 26, 1924.
M. M. GOLDBERG
CASH REGISTER
Filed June 21, 1920    10 Sheets-Sheet 7
1,506,056
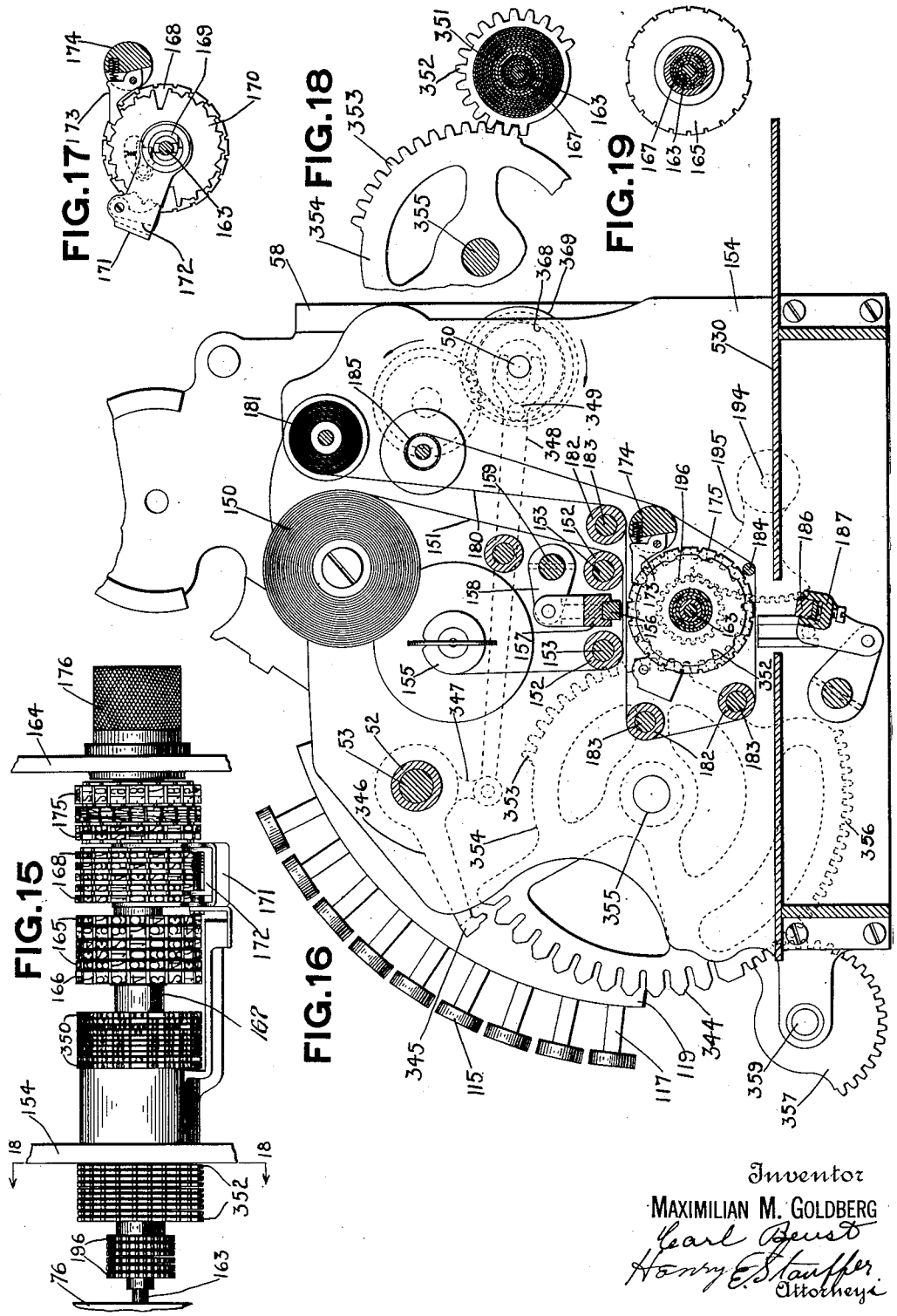
Inventor
MAXIMILIAN M. GOLDBERG Aug. 26, 1924.
M. M. GOLDBERG
1,506,056
CASH REGISTER
Filed June 21, 1920   10 Sheets-Sheet 8
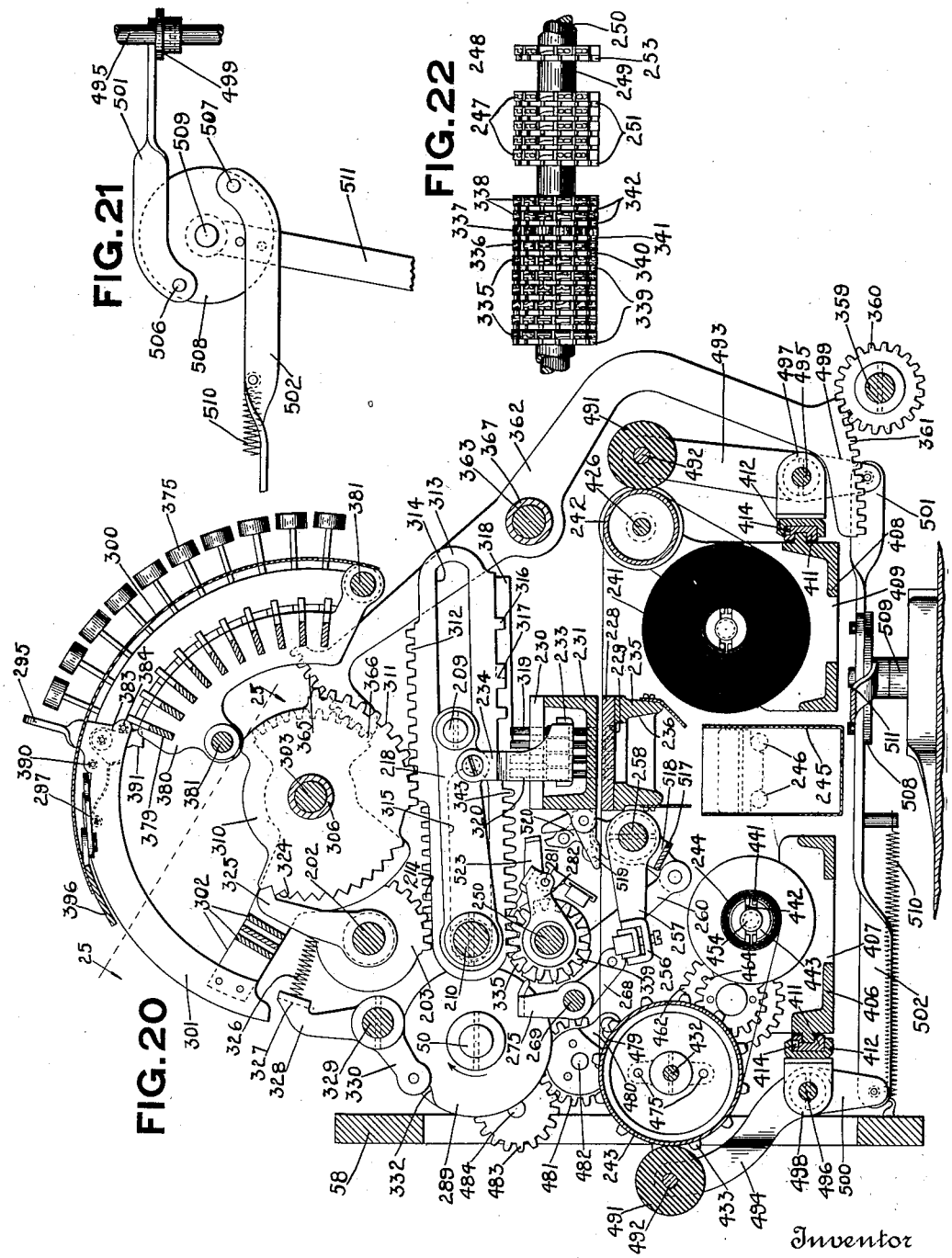
Inventor
MAXIMILIAN M. GOLDBERG
Attorneys Aug. 26, 1924.
M. M. GOLDBERG
CASH REGISTER
Filed June 21, 1920    10 Sheets-Sheet 10
1,506,056
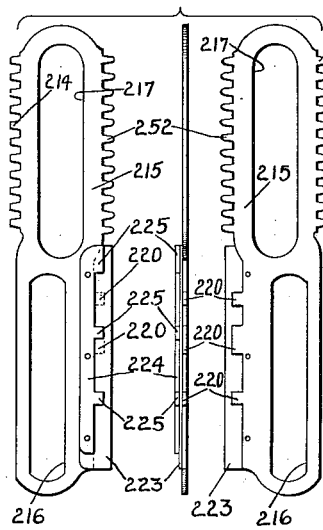
FIG. 26
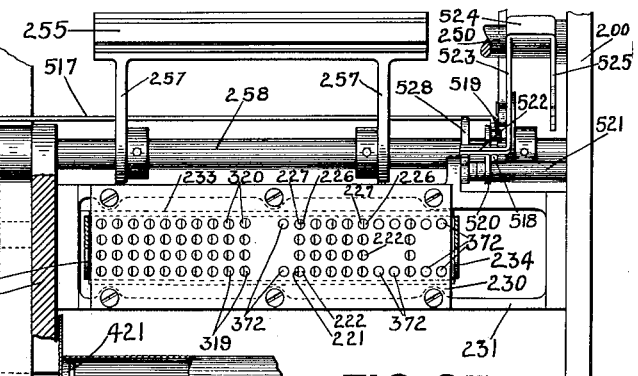
FIG. 27
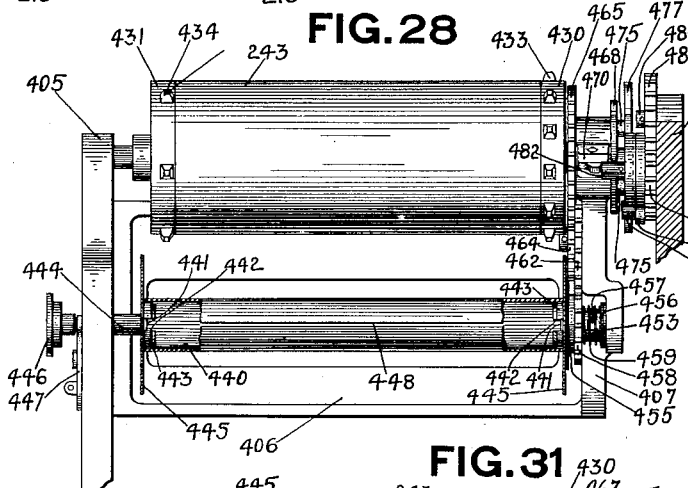
FIG. 28
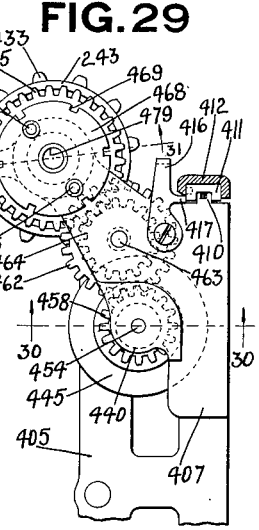
FIG. 29
FIG. 30
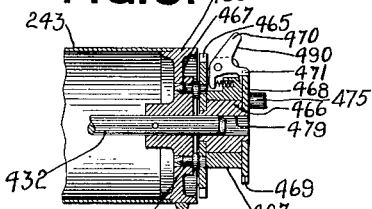
FIG. 31
FIG. 32
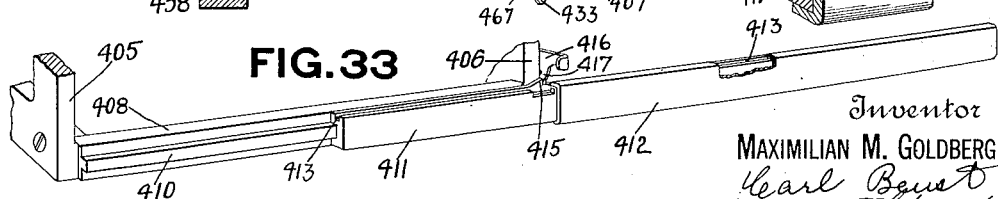
FIG. 33
Inventor
MAXIMILIAN M. GOLDBERG
Carl Beust
Henry E. Stauffer
Attorneys Patented Aug. 26, 1924.

1,506,056

UNITED STATES PATENT OFFICE.

MAXIMILIAN M. GOLDBERG, OF DAYTON, OHIO, ASSIGNOR TO THE NATIONAL CASH REGISTER COMPANY, OF DAYTON, OHIO.

CASH REGISTER.

Application filed June 21, 1920. Serial No. 390,378.

*To all whom it may concern:*

Be it known that I, MAXIMILIAN M. GOLDBERG, a citizen of the United States, residing at Dayton, in the county of Montgomery and State of Ohio, have invented certain new and useful Improvements in Cash Registers, of which I declare the following to be a full, clear, and exact description.

This invention relates to improvements in cash registers and more particularly the type of registers illustrated and described in the Letters Patent of the United States, No. 580,378, granted to Cleal and Reinhard on April 13, 1897, and No. 765,767, granted to Thomas Carroll on July 26, 1904.

The above mentioned machines are provided with a totalizer and are adapted to produce a printed detail record strip of the various transactions.

The main object of this invention is to produce a machine of the above mentioned type which is capable of producing not only a printed record strip but a perforated record strip to be used in connection with an auditing machine and particularly that class of auditing machine shown and described in applicant's pending application for Letters Patent of the United States, Serial No. 316,528, filed Aug. 11, 1919.

Considering, for instance, that the machine herein described is one of a group of machines used in a chain of stores and at the end of any given period, for example, at the close of each day, the perforated record strip from the machine in each store is sent to a central office wherein is installed an auditing machine of the type shown and described in the above mentioned application, Serial No. 316,528. The records from the various stores would then be run through the auditing machine and entered therein and then a single summary record for all stores, and representing the total day's business, would be perforated by the auditing machine.

Therefore, it is not only an object of the present invention to prepare a perforated record strip but to have the items recorded on said strip classified to such an extent that they may be readily analyzed and entered in the auditing machine in their proper places.

Still another object of the present invention is to print certain characters on the regular record strip, opposite the amounts of the various items thereon, under the control of the classification mechanism which controls the perforated record strip, so that the proprietor or manager of each of the various stores may have, for his own benefit, the amounts on his personal detail strip classified to such an extent that the merchandise sold may be easily checked up.

With these and incidental objects in view, the invention consists in certain novel features of construction and combinations of parts the essential elements of which are set forth in appended claims, and a preferred form of embodiment of which is hereinafter described with reference to the drawings which accompany and form part of the specification.

Of said drawings:

Figs. 1<sup>A</sup> and 1<sup>B</sup> together constitute a front elevation of the machine, the differential mechanism, actuators, and the cabinet therefor being removed, except a small portion of the cabinet bearing the classification inscriptions.

Fig. 2 is a detail view of the cam and arm for actuating the operating arms for the perforating punches.

Fig. 3 is a vertical section on line 3—3 of Fig. 1<sup>A</sup>, looking in the direction of the arrows.

Fig. 4 is a detail view of the mechanism for operating the impression hammer and aligning the type wheels which print on the perforated record strip and also shows one of the punch operating arms.

Fig. 5 is a top view of the mechanism shown in Fig. 4, the punch operating arm being omitted.

Fig. 6 is a detail view of the mechanism for inking the type wheels which print on the perforated record strip.

Fig. 7 is a diagrammatic view showing how the perforations are employed either in combination or alone to represent the digits.

Fig. 8 is a left hand elevation of the machine and illustrates the position of the perforated record strip carriage.

Fig. 9 is a fragmentary view of the perforated record strip as prepared by the machine.

Fig. 12 is a vertical section on line 12—12 of Fig. 1<sup>A</sup>, looking in the direction indicated by the arrows, and illustrates particularly the motor releasing mechanism.

Fig. 13 is a detail view of the interlocking mechansm between the motor release key and perforated record strip carriage.

Fig. 14 is a fragmentary view looking from the back of the machine and shows the mechanism for operating the paper feed mechanism, the type aligning and inking mechanism and the punch operating arms.

Fig. 15 is a detail view of the type line which prints on the record strip shown in Fig. 1ᴮ.

Fig. 16 is a vertical section on the dine 16—16 of Fig. 1ᴮ, looking in the direction of the arrows.

Fig. 17 is a detail view of one of the consecutive numbering wheels and operating mechanism therefor.

Fig. 18 is a sectional view on line 18—18 of Fig. 15, looking in the direction of the arrows, and also shows a portion of one of the operating segments.

Fig. 19 is a detail view of one of the classification type wheels shown in Fig. 15.

Fig. 20 is a vertical section on the line 20—20 of Fig. 1ᴬ, looking in the direction of the arrows.

Fig. 21 is a detail view showing the means for manually operating the record strip tension rolls.

Fig. 22 is a detail view of the type line which prints on the prepared record strip.

Fig. 26 is a detail view showing three elevations of one of the amount slides.

Fig. 27 is a top plan view of the perforating die and shows a part of the interlocking mechanism between the paper carriage and the motor release key.

Fig. 28 is a top view of a part of the paper carriage and illustrates the feeding mechanism, the receiving roll being shown in section.

Fig. 29 is an end view of the mechanism shown in Fig. 28, the Geneva cam and its operating means being removed.

Fig. 30 is a detail section on line 30—30 of Fig. 29, looking in the direction of the arrows.

Fig. 31 is a detail section on line 31—31 of Fig. 29, looking in the direction of the arrows.

Fig. 32 is an enlarged detail showing the construction of the carriage supporting slide.

Fig. 33 is a perspective view of one of the carriage supporting slides.

*In general.*

Figure 11:
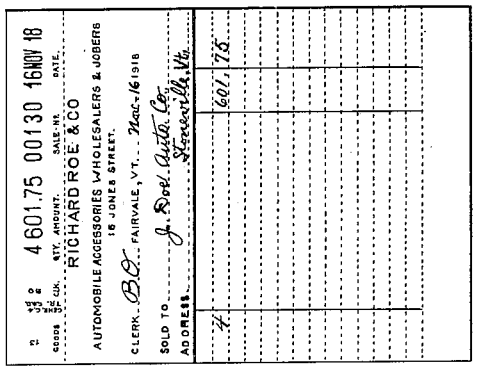
Fig. 11 illustrates a sample slip as printed by the machine.
Figure 10:
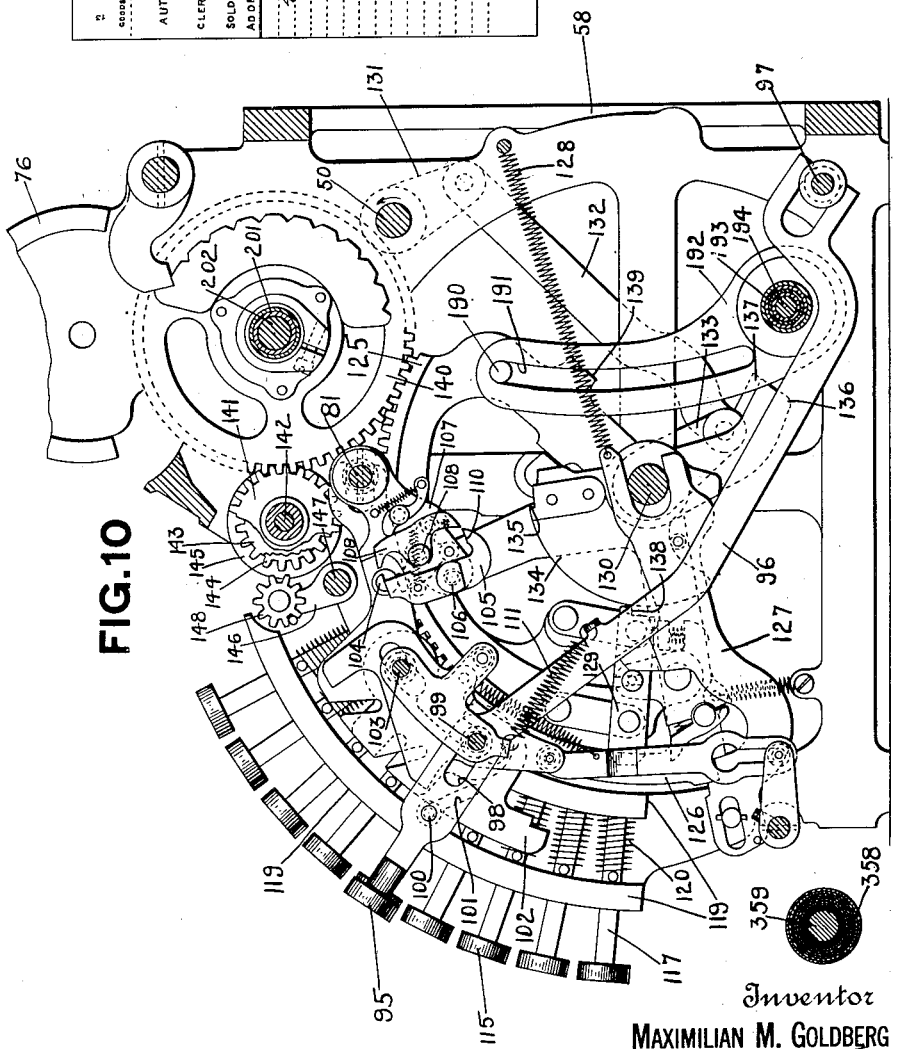
Fig. 10 is a vertical section on line 10—10 of Fig. 1<sup>B</sup>, looking in the direction of the arrows.

Described in general terms the machine shown in the drawings is provided with a keyboard comprising five amount banks of keys and one bank of keys for registering the quantity of articles sold for each transaction. Differential mechanism under the control of the depressed keys is provided, said differential mechanism co-operating with the totalizer for registering therein the amounts of the various transactions. Under the control of the differential mechanism are the regular printing devices for printing the corresponding data of each transaction upon a record strip.

The general mechanism so far described is substantially the same as that illustrated in the above mentioned Cleal and Reinhard Patent No. 580,378, and also the above mentioned Carroll Patent No. 765,767.

As before stated, the machine herein disclosed is designed to produce a perforated record strip having records thereon classified to such an extent that they may be readily analyzed by and entered in an auditing machine described in the above mentioned application, Serial No. 316,528.

To produce the above mentioned record strip the machine herein disclosed is provided with a series of punches under the control of the above mentioned differential mechanism, which in turn is controlled by the depression of the keys in the "Amount" banks and the "Quantity" bank.

There is also provided another series of punches controlled by a special set of levers projecting through long slots in the cabinet. Opposite these slots are classification inscriptions which tell the operator in what position to set the levers in order to classify the amount of any certain transaction.

Co-operating with these levers is mechanism for setting a special series of type wheels, mounted on the regular type line at the right hand end of the machine (Fig. 1ᴮ), whereby the printed detail strip may receive impressions of characters which classify the amount printed in the same line. This classification, in the preferred form, gives the manager the class of goods, the cashier on duty, the kind of transaction, and the clerk who made the sale.

*Perforated detail record.*

The detail record as it appears after being taken from the machine is shown in Fig. 9, except that the lines appearing thereon may be omitted, since they serve no function except to aid in visually locating the control points. It will be noted that the sheet is provided with ten columns of perforations on the right hand side, and ten on the left hand side. Between these is an additional space equal in width to the width of two columns. An additional column of perforations appears in the left side of this space, the other side being blank.

Each of the columns of perforations constituting the right hand set controls one group of totalizers in the auditing machine and the combinations of perforations appearing in the columns determine the particular totalizer to be selected. The number of these columns therefore must be equal to the number of groups of totalizers in the auditing machine. In the machine shown in the above mentioned application, Serial No. 316,528, there are ten groups of totalizers, and therefore, there are ten columns in the control sheet. If a less number of groups of totalizers were used, a number of columns would be made by the machine herein described to agree therewith; if a greater number were used the number of columns would have to be increased in accordance therewith. In any case the number of columns in the record sheet produced by the machine herein described must be equal to the number of groups of totalizers in the above mentioned auditing machine.

The perforations in the ten columns on the left hand side of the sheet control the mechanism which actuates the denominational elements of the totalizers; that is, they control the amounts to be entered upon the denominational elements of the totalizers which have been selected by the perforations in the right hand column. There must, therefore, be upon this side of the sheet as many columns of perforations as there are denominational elements in the totalizers. In the above mentioned auditing machine each totalizer is provided with ten elements. There are therefore ten columns of perforations on a sheet. Should the totalizers be provided with a less number of totalizer elements a corresponding smaller number of columns of perforations would be made in the record strip. If, on the other hand, the totalizers in the auditing machine should have a greater number of totalizer elements a correspondingly greater number of columns would be employed. It is thus seen that the columns on the right hand side of the sheet select the totalizers in the auditing machine upon which the entries are to be made, while the perforations in the columns on the left hand side of the sheet determine the numerical quantities which are to be entered on the totalizers which have been selected.

Since ten groups of totalizers are provided in the above mentioned auditing machine, it is possible in any given case to select as many as ten totalizers for the simultaneous entry of the same data, but not more than ten totalizers.

The additional column of perforations lying adjacent the left hand set of columns is used solely for control purposes and does not in any way enter into the computations of the machine. The blank space lying between the two sets of columns is likewise used for certain control purposes in connection with preparing summary strips by the auditing machine as described in the above mentioned application, Serial No. 316,528.

In Fig. 9 the various columns are provided with legends which illustrate how the data is classified on the record strip prepared by the machine herein described. These legends however, are illustrative only, various other arrangements and classifications may be used, depending upon the needs of the situation.

The numerical quantities, and the classification thereof may both vary. As supplied to commercial enterprises, such as those referred to above, the numerical amounts will most frequently be dollars and cents and the classification will be as to goods, clerks, kinds of transactions, etc. However, the numerical amounts may be other matter. Some of the columns may be set aside for dollars and cents and other columns for other information. In the illustration (Fig. 9) the three columns on the left hand side have been used to indicate the quantity of articles entering into the transactions; columns 4 to 8 inclusive have been used to represent dollars, while columns 9 and 10 indicate cents. It will be noted that the perforations in the first two columns on the left hand side are identical all the way down the strip and by referring to Fig. 7 it will be seen that these perforations represent zero. The perforations in the third column vary and according to the system of perforations used represent the digits as printed in this column. The reason for the first two being zero is so that nothing shall be added upon the corresponding totalizer elements of the auditing machine, which elements are for the purpose of taking care of the overflow from the units totalizer element of the quantity totalizer in the auditing machine. The fourth and fifth rows, which, as stated above, are the highest denominational elements of the amounts, also receive perforations representing zero for the same reason that the first two columns of the quantity columns are perforated with zero perforations.

As to the classifications in the illustration shown, those totalizers from "00" to "59" inclusive, in the auditing machine have been set aside for the classes of goods, and therefore, the first six rows, counting from the right, have been set aside to classify the goods. The totalizers 60 to 69 of the auditing machine have been set aside for cashiers, and therefore, column "7" from the right is for the purpose of classifying the cashiers. The totalizers between 70 and 79 in the auditing machine have been set aside for the transactions such as "Cash", "Charge", "C. O. D.", "C. O. A.", etc. Therefore the eighth column from the right is set aside for these classifications. The totalizers 80 to 99 of the auditing machine are set aside for the clerks who conduct the various transactions, and therefore, the ninth and tenth columns, counting from the right, are set aside to register the clerk who conducted the transactions. In these two columns, 9 and 10, certain letters will be found. These letters are clerks' initials. The lettering is arbitrary and any method of lettering may be used. In this art, however, it has become customary to designate the clerks by letters, and therefore, the printing wheels which print in these two columns are provided with letters in the usual way.

In the eighth column from the right, that is the transaction column, will be found special letters. The star or asterisk is used to indicate cash sales, the legend "S. O. A." sold on approval, and "C. O. D." collect on delivery.

The numbers appearing at various points on the six right hand columns indicate the number of the totalizer in the above mentioned auditing machine which is to receive the accumulation of the amount of the transaction.

The sheet will perhaps be better understood by describing in detail all of the perforations and all of the data pertaining to some particular transaction. For this purpose the transaction at the top of the sheet will be taken. Since four perforations are required to completely control the selection of the ten digits, each transaction is to be considered as represented by four horizontal rows of perforations taken together and considered as a unit. The details of the several transactions are printed in Arabic numerals, so that it is possible for one not familiar with the combinations of perforations to at once readily interpret any given transaction. However, for mechanical reasons the printed interpretation of any particular transaction does not lie immediately adjacent the perforations of that transaction, but as herein shown is displayed two spaces ahead of the transaction which it interprets so that the data printed below the third transaction on the sheet (Fig. 9) is the interpretation of the first transaction represented by the first four horizontal rows of perforations; and the second line of printed data is the interpretation of the second transaction, as represented by the second group of four horizontal rows of perforations, etc., down the sheet.

In the example shown in the drawings and beginning at the left hand side of the sheet, it will be noticed that the perforations in the first column lie one in the first space and one in the fourth; these, according to the diagram (Fig. 7) indicate "0"; but the "0" is not printed in the interpretation. In the second column the holes are arranged in the same position as in the first. They also indicate "0"; but here again the "0" is not printed in the interpretation. In the third column a single perforation lies in the third space; this according to the diagram, (Fig. 7), and the notation on the sheet, indicates "8"; and "8" is shown printed in this position in the interpretation. In the fourth and fifth columns perforations are again found in the first space and in the fourth, which in both cases indicate "0" but here "0" is not printed in the interpretation. The perforations in the sixth, seventh and eighth columns also represent "0" but these are shown printed in the interpretation. In the ninth column perforations appear in the first and third spaces which, according to the diagram (Fig. 7) represent "2"; and "2" is shown printed in this column in the interpretation. In the tenth column, perforations appear in the third and fourth spaces, which, according to the diagram (Fig. 7) represent "5" and "5" is shown printed in this column in the interpretation of this transaction.

The reason for not printing in the "0" columns 1, 2, 4 and 5 is that provision must be made for supplemental or carry over elements in the totalizer of the auditing machine, as previously stated; and if all positions were used in the detail record there would be no extra totalizer elements for this purpose. Therefore, in the detail record all of the positions set aside for quantities and all set aside for dollars have not been used. Those positions that are not used have "0" perforations merely to control the elements of the auditing machine so that nothing should be added to these elements.

Further, following this transaction and considering now the perforations on the right hand side of the sheet, that is, the perforations controlling the selecting of the totalizers and beginning with the column at the left, it will be seen that no perforations appear in this column. Since all totalizers in the auditing machine controlled by this column are found between 90 and 99, the absence of perforations means that the clerk conducting the transaction had a number not falling within this group. In the second column perforations occur in the second and fourth spaces. These perforations stand for "1" which means that clerk "1" in group 9, that is, clerk No. 81, made the sale. But in this art it has been customary to refer to clerks by letters instead of numbers. This custom is followed. All clerks between 80 and 89 are known as "A" clerks, while those between 90 and 99 are known as "B" clerks. The "A" clerks and "B" clerks are distinguished from each other by means of numerals as "A 0", "A 1", "A 2", etc., to "A 9", and "B 0", "B 1", etc., to "B 9". In the third column, still counting from the left, perforations are found in the first and fourth spaces, which according to the diagram (Fig. 7) mean "0". This group of totalizers 70 to 79 in the auditing machine has been set aside for the transactions. This means, therefore, that the transaction was of the kind to be entered on the "0" totalizer of group 7 or the totalizer 70 of the auditing machine. In the interpretation of the transaction the designation is a star. This in the art has come to mean "Cash" so that in this instance the transaction was for cash. But the goods might have been sold on approval "S. O. A." or collect on delivery "C. O. D.", or some other condition as indicated by data on the transaction. In column 4 holes appear in the second and third positions, which according to the diagram (Fig. 7) indicate "4". This means that the transaction was supervised by the cashier 4 of the group 60 to 69 set apart for the cashiers or the cashier whose totalizer in the auditing machine is No. 64. But, cashiers like clerks are sometimes designated by letters instead of numbers and are here designated by the letter "C" together with the number. In this case the cashier was No. 4, and the designation is therefore "C 4". The fifth column, counting from the left, is blank, as are also columns 6, 7, 8 and 9. This means that the class of goods to which the article sold belonged did not fall within any of the groups of totalizers of the auditing machine controlled by these columns. But perforations appear in the last column in the second and fourth positions, which indicate "1". The goods therefore belonged to class 1. The interpretation of the whole first transaction, is that eight articles were sold for $0.25; and that the sale was made by clerk A 1 (81); that the transaction was for "Cash"; and that it was supervised by cashier C 4 (64), and that the goods belonged to class No. 1.

In the third transaction as interpreted by the printed information, four articles were sold for $601.75; the sale was made by clerk B 0 (90); the goods were sent "C. O. D."; the transaction was supervised by cashier C 4 (64); and the goods belonged to class 13.

*Operating mechanism.*

The means for imparting movement to the main cam shaft 50 (Figs. 3, 10, 12, 16 and 20) may be either by hand operated crank or electric motor.

In Fig. 1ᴮ is shown an operating handle 51 having secured thereto a sleeve 52 loose on a stud 53 (Fig. 16). Fast on the sleeve 52 is a pinion 54 meshing with a gear 55 which in turn meshes with a gear 56 on a shaft at the rear of sleeve 52 that meshes with another gear (not shown) fast on the shaft 50. This driving mechanism is old and is shown and described in the Letters Patent of the United States No. 703,639, granted to Thos. Carroll, on July 1, 1902.

When the machine is to be operated by an electric motor, a motor and mechanism for operating the same is used, such as that fully illustrated and described in the Letters Patent of the United States No. 1,144,418, granted to Chas. F. Kettering and W. A. Chryst on June 29, 1915. A portion of a motor and mechanism of this type is shown in Fig. 12 but will be described only briefly herein, as it is very fully illustrated and described in the above mentioned Kettering and Chryst patent. A motor of the above mentioned type is mounted on the rear frame 58. The motor armature shaft 59 supports a worm 60 meshing with a large worm gear 61 carrying the usual clutch 62. A clutch arm 63 carrying a roller 64 is mounted on the back frame 58.

When the arm 63 is rocked and released from the clutch 62 by means to be hereinafter described, the clutch 62 rotates and rocks a member 65 which engages a roller 66 on a lever 67 and rocks said lever so that contact points 68 engage contact points 69 mounted on the motor frame 70 and cause the circuit to be closed whereby the worm 60 is revolved to rotate the worm gear 61. Secured to the shaft which carries the worm gear 61 is a beveled gear (not shown) meshing with another bevel gear 71 fast on the shaft 50. Thus movement is imparted to the shaft 50 by the motor when the arm 63 is rocked to release the clutch 62.

The means for causing the arm 63 to be rocked comprises an arm 72 bifurcated to surround the roller 64. Said arm is fast on a shaft 73 mounted in side frames 76 of the machine. Integral with the arm 72 is an arm 74 having connected thereto one end of a coil spring 75 the other end being connected to a small rod carried by the frames 76. Fast on the shaft 73 is an arm 77 pivoted to one end of a link 78 which has an upwardly extending arm 79 pivoted to an arm 80 fast on a shaft 81 mounted in the frames 76. The lower end of the link 78 is pivoted to an arm 83 pivoted at 84 to an arm 85 loose on a stud 86 carried by one of the frames 76. The arms 83 and 85 form a toggle and are held in the position shown by means of a spring 87 stretched between the arm 85 and an upwardly extending arm 88 integral with the link 78. The operation of the above described mechanism is as follows: The shaft 81 when released, by means to be later described, is rocked counter-clockwise under the influence of the spring 75. The spring 75 also rocks the arm 74, shaft 73, and the arm 77 clockwise, and consequently the arm 72 is rocked likewise to raise the roller 64 and thereby rock the arm 63 to release the clutch 62. The clockwise movement of the arm 77 moves the link 78 to the left (Fig. 12) and rocks the arm 80 and shaft 81 counter-clockwise. This movement of the link 78, with the help of the spring 87, causes the arm 83 to be rocked clockwise about the pivot 82 and the arm 85 to be rocked counter-clockwise about the pivot 86. The arm 85 carries an anti-friction roller 89 which co-operates with a cam arm 90 secured to the cam shaft 50. Near the end of the operation of the machine it is desired to restore the arm 63 to normal position. This is accomplished by the cam arm 90 engaging the roller 89 and rocking the arm 85 clockwise which moves the arm 83 counter-clockwise and causes the link 78 at the same time to be moved towards the right to normal position thereby rocking the arm 77, the arm 74 and the arm 72 counter-clockwise to normal position whereby the arm 63 is restored to its normal position. The cam arm 90 is so designed that it moves the arms 83 and 85 in the directions as described, so that the point 84 passes below the center line between the points 82 and 86. This is what causes the link 78 to be moved towards the right. After the cam 90 has passed out of engagement with the roller 89 the spring 87 returns the members to the position shown in Fig. 12, in which position the toggle is broken.

The means for releasing the shaft 81 comprises a motor key 95 (Figs. 1ᴮ and 10) secured to the upper end of a link 96, the lower end of which is bifurcated to surround a stud 97 carried by one of the frames 76. The link 96 is provided with a guide slot 98 into which projects a stud 99 carried by one of the frames 76. The link 96 also carries a stud 100 which cooperates with a slot 101 in a detent 102 slidably mounted on the stud 99 and a similar stud 103. The detent 102 is provided with a flattened stud 104 which is normally engaged by the upper end of a pawl 105 mounted at 106 on an arm 107 fast on the shaft 81. Also mounted on the arm 107 at 108 is a pawl 109, the upper end of which co-operates with the stud 104. When the key 95 is depressed the pin 100 engages the slot 101 and moves the detent 102 upward whereby the pin 104 engages the upper end of the pawl 109 and rocks said pawl clockwise whereby the lower end of said pawl rides above the portion 110 of the pawl 105 thus preventing the pawl 105 from moving counter-clockwise a sufficient distance to permit the stud 104 to become engaged between the upper end of the pawl 109 and the upper end of the pawl 105 before the release key is fully depressed. As soon as the stud 104 has passed off from the upper end of the pawl 105 the shaft 81 is released and is moved by the spring 75 as previously described. When the cam arm 90 returns these members to their normal position the shaft 81 is rocked counter-clockwise (Fig. 10) to normal position thereby causing the arm 107 to be rocked counter-clockwise, whereby the stud 104 becomes disengaged from the pawls 105 and 109 thereby allowing the detent 102 to return to normal position whereby the motor key 95 under the influence of a spring 111 is restored to its normal position.

Keyboard and differential mechanism.

The machine is provided with five banks of amount keys 115 and one bank of quantity keys 116. The shanks 117 and 118 of the keys 115 and 116, respectively, are slidably mounted in curved portions 119 of the frames 76 and are held in their normal position by springs 120 around the shanks 117 and 118.

The differential mechanism will be but briefly described herein as it is fully shown and described in the above mentioned Cleal and Reinhard patent and in both of the above mentioned Carroll patents. It comprises a plurality of segments 125 (Fig. 10) each controlled by a bank of keys 115 and 116. When a key is depressed it lifts a corresponding detent 126 (Figs. 10 and 12) thereby permitting a retaining bar 127 for such detent, to be moved rearwardly under the action of its spring 128. This rearward movement of the retaining bar not only causes it to hold the detent and depressed key in the moved position but also serves to release and permit movement of the corresponding segment gear 125. Each of the segments 125 carries a latch 129. These latches are constructed normally to hold the segments 125 in whatever position they may be left at the end of an operation of the machine. When the cam shaft 50 is given a rotation it causes an oscillatory movement of a shaft 130 by means of an arm 131, link 132 and arm 133. The arm 131 is fast on the shaft 50. The arm 133 is fast on the shaft 130. The arm 131 being shorter than the arm 133, a rotation of the shaft 50 merely causes an oscillation of the arm 133 through the link 132. Fast on the shaft 130 is a driving segment 134, one for each of the segments 125 and provided with shoulders 135 for engaging shoulders 138 on the latches 129 and through them lifting the segments 125 until the latches 129 are disengaged from the segments 134 by engagement of latch tripping members with the shanks 117 of the depressed keys. The segments 134 have downwardly extending arms 136 provided with flanges 137 for engaging shoulders 139 on the segments 125 when the arms 136 are moved upward. By this means such of the segments 125 that are not in zero position are returned to zero position and then such of the segments as are released by depressed keys will be rocked clockwise because of the engagement of the shoulders 135 with the shoulders 138 on the latches 129. The extent of upward movement of the segments 125 is determined by depressed keys which serve to unlatch the same from the segments 134 at the desired points, the segments 134 continuing their complete movement independently of the segments 125. The segments 125 mesh with intermediate gears 140 which in turn mesh with gears 141 loose on a shaft 142 mounted in the frames 76. Fast on each gear 141 is a pinion 143. Adjacent the pinion 143 is a pinion 144 connected to a totalizer wheel 145. A frame 146 fast on a rod 147 carries a broad pinion 148 which meshes with both pinions 143 and 144.

Suitable means are provided for rocking the frame 146 so that the broad pinion 148 will be out of mesh with the pinions 143 and 144 on the return movement of the segments 125 but in mesh with these pinions on the forward movement of the segments 125. By this means the differential movements of the segments 125 are additively accumulated on the wheels 145 as such amount is communicated in one direction only through the gears 140 and 141, the pinion 143, and the broad pinion 148 and the pinion 144, to the totalizer wheel 145.

*Printing mechanism.*

The printing mechanism shown in Figs. 1ᴮ and 16 is substantially the same as that shown and described in Letters Patent of the United States, No. 1,156,258, granted to E. J. Von Pein on October 12, 1915. Therefore, this mechanism will be but briefly described herein.

Fed from a supply roll 150 (Fig. 16) is a detail strip 151. Said strip is passed downward and underneath rollers 152, mounted on studs 153 carried by a printer frame 154 and wound upon receiving roll 155. Between the rollers 153 is an impression platen 156 mounted in a block 157 pivoted on an arm 158 fast on shaft 159. The shaft 159 is caused to rock by a suitable means driven from the cam shaft 50.

Directly below the platen 156 and mounted upon a shaft 163 supported by the frame 154 and a frame 164 is a type line (Figs. 15 and 16).

This type line, in part, comprises 5 "amount" type wheels 165 and 1 "quantity" type wheel 166 secured to the ends of nested sleeves 167 mounted upon the shaft 163.

Adjacent the type wheels 165 is a row of consecutive numbering type wheels 168 (Figs. 15 and 17) loose upon a turn-to-zero sleeve 169 mounted upon the shaft 163. Secured to the side of each of the wheels 168 is the usual feeding ratchet 170. Loose on the sleeve 169, and straddling wheels 168, is a yoke 171, carrying a differentially tined pawl 172 which engages the ratchets 170. The yoke frame 171 may be rocked in any suitable manner whereby through said rocking, the pawl 172, through its engagement with the ratchets 170 causes the consecutive numbering type wheels 168 to be advanced in the usual step by step fashion. A consecutive numbering device of this type is shown in the above mentioned Carroll patent No. 703,639. To prevent retrograde movement of the type wheels 168, each of the ratchets 170 has cooperating therewith a retaining pawl 173 (Fig. 17), pivotally mounted in a slotted rod 174, carried by the frames 154 and 164.

Adjacent the consecutive operating type wheels 168, and mounted in the usual manner, is a set of date type wheels 175. These date wheels are adapted to be set in the usual manner through knurled knobs 176.

The means for inking the type wheels, just described, whereby a record may be printed upon the detail strip 151 comprises an inking ribbon 180 fed from a supply roll 181, around three rolls 182 mounted on studs 183 supported by the frames 154 and 164, and underneath stud 184 and wound upon a roll 185.

By referring to Fig. 1ᴮ an illustration of the printing from the type wheels 165, 166 and 168 will be seen. Taking for instance, the lowest line of printing, "4" designates the quantity of articles sold and is printed by type wheel 166; "601.75" represents the amount of the four articles sold and is printed upon the type wheels 165; "00130" designates the consecutive number and is printed by the type wheels 168. As is usual in the art, the detail strip 151 does not extend over the date type wheels 175, and consequently no date is printed on said strip.

All of the type wheels 165, 166 and 168 are provided with two sets of type on their peripheries, one set of type cooperating with platen 156 whereby records are made upon the detail strip, as just described, the other set cooperating with platen 186 (Fig. 16), mounted in a block 187, which is operated in the usual manner and causes said platen to make contact with the lower set of type on the type wheels 165, 166 and 168 and also to co-operate with the date type wheels 175. The lower set of type and the date wheels 175 are adapted to print on an inserted slip or other paper, such as illustrated in Fig. 11. In this figure is illustrated exactly the same record at the top of the slip as that illustrated at the bottom of record strip in Fig. 1ᴮ, except that the date is printed on the slip.

The "amount" type wheels 165 and the "quantity" type wheel 166 (Fig. 15) are differentially positioned under control of the keys 115 and 116 (Figs. 1^A and 1^B) by the following means. Each of the segments 125 carries a stud 190, which projects into a slot 191, formed in an arm 192. The arms 192 are secured to one end of nested sleeves 193 loose on a shaft 194 supported in the frames 76. Secured to the other end of the nested sleeves 193 are segments 195 (Figs. 1^B and 16) meshing with gears 196, fast on the sleeves 167, which carry on their other ends the type wheels 165 and 166.

From the above description, it will be clear that when the segments 125 are differentially positioned under the control of the keys, as previously described, that through the pins 190 and slots 191, the arms 192 are rocked differentially according to the different positioning of the segments 125. The rocking of the arms 192 through the sleeves 193, segments 195 and gears 196, differentially position the type wheels 165 and 166 commensurate with the value of the keys depressed.

*Record producing mechanism.*

The mechanism for producing the perforated record strip previously described and illustrated in Fig. 9, will now be described.

First, that part of the mechanism which perforates the holes which interpret the quantity of articles sold and the amount of said articles will be described:

Practically all of the record producing mechanism is supported by two side frames 200, secured to the back frame 58 and the base of the machine.

The gears 140 (Fig. 10), which mesh with the segments 125, are secured to one end of nested sleeves 201 loose on a shaft 202, carried by the frames 76 and 200. Secured to the other ends of the sleeves 201 are segments 203 and 204 (Figs. 1^A, 3 and 20). There are five segments 203 and one segment 204. The segment 204 is on the largest sleeve 201. The segment 204 meshes with teeth 205 (Fig. 3) formed on a slide 206 provided with slots 207 and 208 which surround a rod 209 and a shaft 210 respectively. The segments 203 mesh with teeth 214 (Figs. 20 and 26) on slides 215, like the slides 206, provided with slots 216 and 217, which surround the rod 209 and the shaft 210 respectively. The shaft 210 is rotatably mounted in the frames 200. The rod 209 is carried by an arm 218 (Figs. 1^A and 8), fast on the shaft 210 and an arm 219 (Figs. 1^A, 2 and 4) also fast on said shaft. The slides 215 are provided with projections 220 which cooperate with one-half round portions 221 of punches 222 (Figs. 1^A, 3 and 27). Secured to each of the slides 215 is a thin plate 223 (Fig. 26) and another plate 224 provided with projections 225, said projections cooperating with one-half round portion 226 of the punches 227. The plate 223 is adapted to slide between the portions 221 and 226 as the slide 215 is being positioned.

The reason for cutting punches 222 and 227 so that their upper portions are only one-half round is because otherwise the projections 220 (Fig. 26) could not be positioned to make the combinations according to the diagram in Fig. 7. The slide 206 (Fig. 3) is provided with the double projections 220 and 225 in identically the same manner as the slides 215.

The upper ends of the punches 222 and 227 project through a plate 230 (Figs. 3, 20 and 27) mounted on a channel bar 231, supported by the frames 200. The lower ends of the punches project through holes in said channel bar. The punches are kept from dropping down by means of shoulders 232, intermediate their ends which rest on a U shaped plate 233, through which the punches project. Said plate 233 has secured to its ends parallel arms 234 (Figs. 1^A, 3, 4, 8, 20 and 29). One of the arms 234 is pivoted upon the arm 219 and the other arm 234 is pivoted upon the arm 218 so that said arms 234 and the plate 233 form a basket which carries the punches 222 and 227. The shoulders 232 on the punches are long enough so that they will allow only a small clearance between the plate 230 and the plate 233, thereby preventing the punches from jumping up.

From the above description it will be clear that the gears 140 (Fig. 10) are differentially positioned by the segments 125 under the control of the keys 115 and 116, and that through the sleeves 201 and segments 203 and 204, the slides 206 and 215 are differentially positioned commensurate with the value of the keys depressed.

The "Amount" keys 115 control the positioning of the slides 215 and the "Quantity" keys 116 control the positioning of the slide 206. After the slides have been differentially positioned, as just described, and during the rotation of the shaft 50 a disk 237 (Figs. 2, 4 and 5), having in one side thereof, a cam slot 238, into which projects an anti-friction roller 239, acts on said roller and causes an arm 240 fast on shaft 210 and consequently said shaft and the arms 219 and 218 to be rocked in a clockwise direction (Figs. 4, 8 and 20) whereby the rod 209 carried by the arms 219 and 218 is moved downward and causes the slides 206 and 215 to be rocked clockwise (Fig. 3) with shaft 210 as a pivot for said slides whereby the projections 220 and 225, which happen to be above the portions 221 and 226 of the punches 222 and 227 engage said portions and cause the punches to be moved downward thereby causing perforations to be made in the previously described record strip.

The blank record paper provided with square holes in the edges which will be hereafter described, is fed from a supply roll 241 (Fig. 8) up over a roller 242 and to the left underneath the channel bar 231 and over a roller 243, underneath said roller and wound on a receiving roll 244. The supply roll 241, rollers 242 and 243 and receiving roll 244, are carried in a movable carriage to be hereinafter described. Between the rolls 242 and 243 the paper passes over a plate 228 (Figs. 3, 8 and 20) provided with holes 229 which register with the punches 222, 227, 319, and 320, and punches 372 (Fig. 27) later referred to. The plate 228 is mounted upon a casting 235 mounted between the frames 200. This casting is provided with a large opening 236. The plate 228 forms a support for the paper when the above mentioned punches are moved downward to perforate said paper. The small paper punchings drop through the hole 236 in the casting 235 into a container 245 supported by pins 246 carried by the frames 200.

As previously stated, the perforations in the record strip are interpreted on said strip by means of legends printed from a set of type wheels. This set of type wheels interprets the "Amount" and "Quantity" perforations and comprises five "Amount" type wheels 247 (Fig. 22) and one "Quantity" type wheel 248 (Figs. 3 and 22) loose on a sleeve 249 mounted on a shaft 250 supported by the frames 200.

The type wheels 247 carry numerals 1 to 9 and zero, the zeros being smaller than the numerals 1 to 9 for the purpose of emphasizing the numeral at the left hand end of numbers printed. In this connection attention is called to Fig. 9. The effect produced is substantially the same as that obtained by eliminating the zeros to the left of numbers, and it is accomplished without the use of any added mechanism.

Secured to the side of each of the type wheels 247 is a gear 251, which meshes with teeth 252 formed on the slide 215 (Fig. 26). Secured to the side of the type wheel 248 is a gear 253 (Figs. 3 and 22) which meshes with teeth 254 formed on slide 206.

From the above description, it can be seen that when slides 206 and 215 are differentially positioned under the control of the keys 115 and 116 that the type wheels 247 and 248 will be set commensurate with the value of the keys depressed. Co-operating with the type wheels 247 and 248 is a resilient platen 255 (Figs. 3 and 27) adjustably mounted in a channel bar 256 carried by parallel arms 257 fast on a shaft 258 supported by the frames 200. Also fast on shaft 258 is an arm 259 (Figs. 3, 4 and 5) which has pivoted to its lower end a pitman 260 the upper end of which is bifurcated to surround shaft 50. Pitman 260 carries an anti-friction roller 264 which projects into a cam race 265, formed in the side of the disk 237. The configuration of the cam race 265 is such that the pitman 260 is first moved upward in the direction of its length, thereby rocking the arm 259, shaft 258 and arms 257 in a clockwise direction, whereby the platen 255 engages a plate 278 carrying an ink pad 277, to be hereinafter described, and presses said pad 277 against the type wheels 247 and 248 to ink them after which the platen 255 and the ink pad 277 are returned to normal position. The platen 255 is again raised and engages the underside of the record strip (Fig. 8) and presses said strip against type wheels 247 and 248, thereby causing an interpretation of the perforations for that particular operation of the machine, to be printed on the record strip, after which the platen 255 is lowered to its normal position, away from the record strip and type wheels.

Means for aligning the type wheels 247 and 248 while taking an impression therefrom, comprises, a cam slot 266 formed in the pitman 260 into which projects a pin 267 carried by an arm 268 loose on a shaft 269 supported by the frames 200. Secured to the arm 268 by means of a hub is an arm 270 engaged by a pin 271 carried by an arm 272 fast on shaft 269. The pin 271 is held in engagement with the arm 270 (Figs. 5 and 14) by a torsion spring 273, one end of which presses against the pin 271 and the other end lies in a groove of the arm 270. Integral with the arm 272 is a yoke 274, the other end of which is integral with the arm 275 (Fig. 20) fast on the shaft 269. The yoke 274 is provided with projections 276, adapted to engage the gears 251 and 253. This engagement is caused by the action of the cam slot 266 upon the arm 268, causing said arm 268 and the arm 270 to be rocked clockwise, (Fig. 4), whereby the arms 272 and 275 under the influence of the spring 271 follow up the movement of the arms 268 and 272 thereby causing projections to engage the gears 251 and 253, whereby said gears and consequently the type wheels are held to prevent movement during the time the impression is taken therefrom by the platen 255.

Means for inking the type wheels comprises, an inking pad 277 mounted on plate 278 pivoted at 279 (Fig. 6) and on an arm 280 and at 281 (Fig. 20) on an arm 282, said arms being made integral by a yoke 283. These arms are loose on the shaft 250.

The plate 278 is held in normal position by a spring plunger 284 supported by formed portions 285 of the arm 280. Pivoted to said arm 280 is the lower end of a pitman 286, the upper end of which is bifurcated to surround the shaft 50. Said pitman carries an anti-friction roller 287 projecting into a cam race 288 formed in the side of a disk 289 (Figs. 3, 6 and 14) fast on shaft 50.

The configuration of the race 288 is such that the pitman 286 is moved upward and then downward to normal position. The upward movement rocks the arms 280 and 282 clockwise to position the ink pad 277 in proper relation with the type wheels 247 and 248 after which the platen 255 engages the plate 278, as described above, and presses the pad 277 against the type wheels thus causing them to be inked so that an impression may be made therefrom upon the record strip. The downward movement of the pitman 286 to normal position rocks the arms 280 and 282 clockwise to normal position thereby restoring the inking pad to normal position. As before stated, the machine herein described is designed not only to produce a perforated record of the quantity of articles sold and the amount of said articles but also to cause a classification of said amounts, or, in other words, to classify them such as "Clerk making the sale," "Kind of transactions," "Cashier who supervised the sale" and "Particular class of goods sold." These classifications are printed upon the detail strip indicated in Fig. 1B, and upon the inserted slip (Fig. 11). In addition to making perforated classifications of the transactions involved, legends interpreting said perforations are also printed upon the perforated record strip illustrated in Fig. 9.

Figure 23:
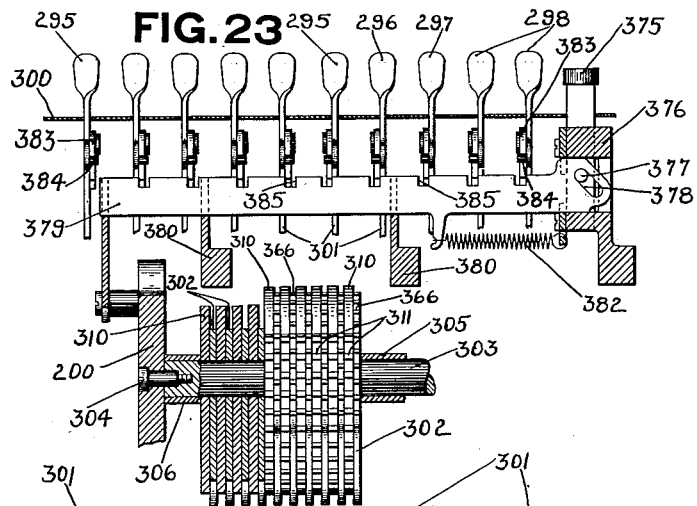
Fig. 23 is a section on the line 23—23 of Fig. 3, looking in the direction of the arrows, and also shows the setting segments for the classification perforating slides.
Figure 24:
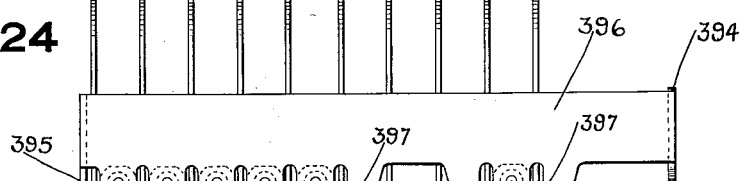
Fig. 24 is a top view of the classification levers and illustrates the interlocking mechanism between certain of said levers.
Figure 25:
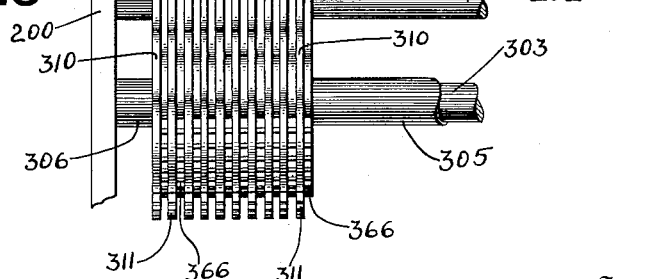
Fig. 25 is a section on the line 25—25 of Fig. 20, looking in the direction of the arrows.

The means for controlling the classification of any particular transaction comprises, a set of manually operated levers 295 arranged in four groups comprising 6 levers (Figs. 1A, 23 and 24), one lever 296, one lever 297 and two levers 298. These levers project through slots 299 in a portion 300 of the cabinet. Inscribed on the cabinet 300 adjacent the first six slots 299 counting from the left (Fig. 1A) are the numerals "00" to "59". These characters "00" to "59" represent 60 different classes of goods. Adjacent the seventh slot are inscribed "C0" to "C9", which represent the different cashiers. Adjacent the eighth slot are the inscriptions "Cash-0", "CR-1", "COD-2", "SOA-3", "ORD-4", "Exch-5", "ALL-6", "RET-7", "Trans-8" and "Part Pay"-9. These inscriptions represent various transactions, such as—Cash, Credit, Collect on delivery, Sent on approval, etc. Inscribed adjacent to the ninth slot are "A0" to "A9" and adjacent the tenth slot are inscribed— "B0" to "B9". These inscriptions adjacent the ninth and tenth slots represent the various clerks.

Each of the levers 295, 296, 297 and 298 is integral with a crescent shaped plate 301 (Figs. 3, 8, 23, 24 and 25). The plates 301 are secured to levers 302 loose on a rod 303, supported by trunnion screws 304 in the frames 200. The levers 302, with exception of one, are bent to get the desired lateral spacing on the rod 303. Sleeves 305 and 306 prevent lateral movement of the levers.

Each of the levers 302 has secured to a side thereof a plate 310 having teeth meshing with teeth 312 formed on slides 313 having slots 314 and 315 which surround the rod 209 and shaft 210 in identically the same manner as the previously described slides 206 and 215. The slides 213 are provided with projections 316 and 317 separated by a thin plate 318 and located substantially the same as the projections on the slide 215 illustrated in Fig. 26. These projections cooperate with the punches 319 and 320, which punches are identically the same as punches 222 and 227, as previously described.

From the above description it will be clear that when one of the levers 295, 296, 297 and 298 is moved down in a slot 299 (Fig. 1) that the plate 310 associated therewith is rocked clockwise (Fig. 20) thereby moving the slide 313 to position the projections 316 and 317 thereon to control the operation of the punches 319 and 320. After the slide has been positioned, as just described, it will, when the shaft 210 is rocked, as previously described, be moved downward whereby the projections 316 and 317 which register with the punches will force said punches down and perforate the record strip commensurate with the value of the position to which the lever 295, 296, 297 or 298 has been set.

The first lever 295 on the left hand side (Fig. 1A) controls the slide which operates the punches which perforate holes in the first column on the right hand side (Fig. 9) of the record strip. The second lever controls the perforations in the second column from the right and the third lever on the left (Fig. 1A) controls the perforations in the third column from the right (Fig. 9) and so on through the rest of the levers. The right hand lever 298, (Fig. 1A) controls the perforations in the tenth column from the right (Fig. 9).

Means is provided for retaining the levers in position after the machine is started, thereby preventing the slides 313 from being moved out of proper alignment with the punches. This means comprises a series of V shaped notches 324 (Fig. 20) formed in the back side of the plates 310. Engaged in one of the notches 324 in each of the plates 310 is a pawl 325 loose on the shaft 202 and held in engagement with said notches by springs 326 pressed between said pawls and a yoke integral with parallel arms 328 fast on a shaft 329 mounted in the frames 200. When any of the levers are set, the pawl 329 simply rocks in and out over the teeth between the notches 324. After the machine is started, the springs 326 are compressed thereby holding the pawls 325 more firmly in engagement with the notches 324, thus preventing the levers from being accidentally moved out of position. The means for compressing the springs 326 comprises an arm 330 (Figs. 3, 14 and 20) carrying an anti-friction roller 331 which normally rests in a depression 332 in the periphery of the disk 289.

From this it can be seen that when said disk is rotated by the shaft 50, the roller 331 is cammed out of the depression 332 and caused to ride upon the true periphery of the disk 289, thereby causing the arm 330, shaft 329 and consequently the arms 328 to be rocked clockwise (Fig. 20) thereby compressing the springs 326 and holding the pawls 325 more firmly in the notches 324.

Means is also provided, as previously stated, whereby the perforations controlled by the just described levers are interpreted by the legends on the perforated record strip. Loose on the shaft 250 are six type wheels 335 (Fig. 22), one type wheel 336, one type wheel 337 and two type wheels 338. Each of the type wheels 335 has secured to a side thereof a gear 339. The type wheel 336 has secured to its side a gear 340, type wheel 337 has secured to its side a gear 341 and the type wheels 338 have secured to their sides gears 342. The gears 339 mesh with the racks 343 on the slides 313 controlled by the levers 295. The gear 340 meshes with the rack 343 on the slide 313 controlled by lever 296, the gear 341 meshes with the rack 343 on the slide 313 controlled by the lever 297 and the gears 342 mesh with the racks 343 on the slides 313 controlled by the levers 298. From this it can be seen that when the levers are positioned as previously described the slides 313 also position the type wheels 335, 336, 337 and 338 whereby an interpretation of the perforations controlled by said levers is made upon the record strip (Fig. 9). The means for taking the impression from the type wheels just described is the previously described platen 255 which is of sufficient length to co-operate with all of the type wheels shown in Fig. 22.

The previously described ink pad 277 is also of sufficient length to engage all of the type wheels illustrated in Fig. 22. The yoke 274 is also of sufficient length to engage all of the type wheels (Fig. 22). As the impression mechanism, inking and aligning mechanism has previously been described in connection with the type wheels 247 and 248, it is not necessary to describe the same in connection with the type wheels controlled by the levers 295.

Means are provided for printing the classification of transactions on the detail strip (Fig. 1B) and upon the inserted slip (Fig. 11). These means comprise a set of type wheels 350 (Fig. 15) secured to the ends of nested sleeves 351, 351 mounted outside of the sleeves 167, which carry the type wheels 165 and 166. Secured to the other ends of these sleeves 351 are gears 352 (Figs. 15 and 16) meshing with teeth 353, formed on disks 354 mounted on a stud 355 carried by the frame 154. Also formed on disks 354 are teeth 356 (Figs. 1B and 16) meshing with segments 357 secured to one end of nested sleeves 358 loose on a shaft 359 supported by the frames 76 and 200. One of these segments is fast upon the shaft 359. Secured to the other end of the sleeves 358 and the shaft 359 are gears 360 (Fig. 1A, 8 and 20) meshing with segmental portion 361 on the lower ends of levers 362 loose on a rod 363 held in the frames 200 by trunnion screws 364 (Fig. 8). Integral with the upper end of each of the levers 362 is another segmental portion 365 (Fig. 20) meshing with segments 366 integral with the levers 302. The levers 362 are laterally spaced on the rod 363 by sleeves 367. From this description it will be clear that when the levers 295, 296, 297, and 298 are set to control a classification of perforations and the printed interpretations thereof on the record strip (Fig. 9), the movement of said levers is transmitted through the levers 362, gears 360, sleeves 358, segments 357, disks 354, segments 352, sleeves 351 to the type wheel 350 (Fig. 15) whereby said type wheels are positioned commensurate with the positioning of the above mentioned setting levers, so that the type on the upper half of their periphery prints on the detail strip (Fig. 1) and the type on the lower half of their periphery prints on the inserted slip (Fig. 11). The previously described platens 156 and 186 are of sufficient length to engage the type wheels 350 when taking an impression from the other type wheels on the type line (Fig. 15).

Taking for example, the last printed transaction on the detail strip in Fig. 1B, which shows four articles sold for $601.75 and also the consecutive number of this transaction, it will be seen by referring to the smaller figures opposite these just mentioned that there are four columns of printing. In the first column to the left is "13" which denotes that the goods sold belonged to class 13; in the next column is "C-4" which denotes that cashier "C-4" or "64" supervised the transaction. In the third column is printed "COD" which denotes that the transaction was sent "collect on delivery." In the fourth column are the characters "B0" which denotes that clerk "B0" or "90" handled this particular transaction. By referring to Fig. 11 it will be noted that the same printing is found opposite the amount printed at the top of the slip.

Means is provided for aligning the disks 354 so that the type wheels 350 will be held in perfect alignment when impressions are taken therefrom. This means comprises, aligning notches 344 (Fig. 16) formed in the disks 354. Co-operating with said notches is an aligner 345 wide enough to engage all of the disks 354. The aligner 345 is integral with arms 346 (Figs. 1ᴮ and 16) loose on the sleeve 52. Integral with one of the arms 346 is an arm 347 having pivoted thereto one end of a pitman 348, the other end of which is bifurcated to surround shaft 50. The pitman 348 carries an anti-friction roller 349 projecting within cam race 368 formed in the side of a disk 369 fast on cam shaft 50. The configuration of the race 368 is such that at the proper time the pitman 348 is moved to the right thereby rocking the arms 347 and 346 counter-clockwise whereby the aligner 345 engages the notches 344 opposite said aligner at the time thereby holding the type wheels 350 in perfect alignment until the pitman 348 is moved to the left to normal position thereby rocking the arms 347 and 346 clockwise to normal position thus removing the aligner 345 from the notches 344.

As previously stated, the first two columns counting from the left (Fig. 9) are always perforated with zero interpretations to take care of the overflow from the quantity totalizers in the auditing machine illustrated and described in the above mentioned application No. 316,528. The fourth and fifth rows are perforated with interpretations for the purpose of taking care of the overflow from the amount totalizers in the above mentioned Goldberg application. In Fig. 9 it will also be noticed that the eleventh column counting from the left has two perforations opposite each transaction which is perforated on the sheet. These perforations, as above stated, have absolutely no control over the amounts or classification of the amounts but are used simply to control certain contacts in the above mentioned auditing machine when the strip is used therein.

The mechanism for perforating these holes in the first, second, fourth, fifth and eleventh columns will now be described and comprises, five arms 370 (Figs. 1ᴬ and 3) one end of which is fast upon shaft 210, the other end surrounding rod 209. Each arm 370 is provided with projections 371, co-operating with punches 372 carried by the plate 233. From this it can be seen that when the shaft 210 is rocked as previously described, that the arms 370 will be rocked first clockwise thereby moving punches 372 downward and causing the perforation of the holes in the first, second, third, fourth, fifth and eleventh columns counting from the left (Fig. 9) as above stated. These arms 370 are in no way controlled either by the keys 115 and 116 or by the levers 295, 296, 297 and 298 and are always operated by the main cam shaft 50.

Sometimes it is difficult to set levers, like the levers 295, in the exact position, therefore, the machine herein described is provided with a series of stop keys 375 (Figs. 1ᴬ and 23) slidably mounted in a bracket 376 secured to right hand frame 200. The keys are marked with numerals "0" to "9", there being one key for each of the 10 operative positions of the levers 295, 296, 297 and 298. Each key is provided with pin 377, projecting into slot 378 formed in the bar 379 slidably mounted in the bracket 376 and brackets 380 mounted on rods 381 supported by the frames 200. The bar 379 is held in normal position by a spring 382 stretched between a projection on said bar and the bracket 376. There is a bar co-operating with each of the keys. Pivoted to each of the plates 301 is a spring pressed pawl 383 (Figs. 3, 8, 23 and 24), one edge of which rests against a pin 384 carried by the plate 301. The pawls 383 are normally in alignment with the notches 385, formed in the bars 379 with exception of the extreme left hand pawl 383 (Fig. 23), which is entirely out of alignment with the bar 379. If it is desired, for instance, to set the right hand lever 298 to the fifth position or opposite "B-5", the "5" key is depressed and held. The depression of the key through the pin 377, slot 378, moves the bar 379 connected thereto to the left thus moving the notches 385 out of alignment with the pawls 383 (Fig. 23) so that as the lever 298 is moved downward, the edge 386 of the pawl 383 engages the unbroken portion of bar 379 and rocks the pawl clockwise until said pawl engages a pin 390 carried by the lever 301, at which time the lever 298 will come to a stop. When the lever has been set, the operator removes the finger from the key 375 and allows it to come up under the influence of the spring 382 connected to this particular bar. As it is not necessary to restore the levers 295 to 298 to their normal position after the operation of the machine, sometimes it may occur that a lever which was set in "9" position might have to be set in the 5 position. In this case the desired stop key 375 is depressed and the lever is moved upward until the edge 391 of the pawl 383 engages the unbroken portion of bar 379, thereby rocking said pawl counter-clockwise until it again engages the pin 384, at which time the lever will come to a stop in the desired position. The notches 385 in all of the bars 379 always being in alignment with the pawls 383 none of the bars except the particular one moved by the depression of the key will cause any interference with the pawls to stop the levers.

As previously stated, the group of levers 295 control the perforations and printing of the classes of goods. As it is desired to prevent perforations from being made in more than one of the six columns beginning from the right (Fig. 9) for a certain transaction, it is necessary to provide interlocking means whereby only one of the levers 295 may be operated for a given transaction.

This interlocking mechanism comprises a plate 394 (Figs. 3 and 24) secured to the right hand frame 200, and a plate 395 (Figs. 8 and 24) secured to the left hand frame 200. Integral with these plates is a bar 396 upon which are pivotally mounted five pawls 397 which cooperate with the notches 398 in the plates 301 integral with the levers 295. Adjacent the right hand lever 295 the bar 396 is formed with a projection which lies directly adjacent the notch 398 in the plate 301 associated with these levers. Movement of, say the second lever 295 counting from the left, causes the pawls 397 adjacent said lever to be spread apart which causes all of the pawls to the right to be moved slightly counter-clockwise so that their pointed ends are rocked into the notches 398 of all of the levers except the one being operated. As the operated lever remains between the two pawls it causes all of the other pawls to stay so close together that there is no room for another lever between any other two pawls, thus preventing an operation of any of the other levers after one has been moved out of its normal position.

There being only one lever 296 and one lever 297, one of which controls the cashier's perforations and the other the transaction perforations, it is not necessary to have any interlocking mechanism between them. However, there is an interlocking pawl 397 between the two clerks' levers 298, thus preventing the operation of more than one of these levers for a given transaction.

*Paper carriage.*

As previously stated, the paper is fed from a supply roll 241 over a roller 242 and another roller 243 and wound upon the receiving roll 244. These rolls are carried by a carriage which is arranged to be slid into and out of the machine. This carriage comprises a frame 405 (Figs. 8, 27 and 28) fastened to the horizontal portions 406 of a frame 407 and the horizontal portion 408 of a frame 409. Integral with the portions 406 and 408 of the frames 407 and 409 are projections 410 fitting within channel bars 411 slidably mounted in channel bars 412 (Figs. 8, 20, 32 and 33). The channel bars 412 are secured to the frames 200. The bar 411 is provided with a groove 413, which engages a pin 414 carried by the channel bar 412. The groove 413, however, does not run the entire length of the bar 411, and therefore, when the bar is brought out in the position shown in Fig. 33, it can be moved no further, the pin 414 engaging the end of the groove 413 and preventing this. There is on each channel bar 411, a projection 415 cooperating with a latch 416, one of which is carried by each frame 407 and 409.

Each latch has a projection 417, which engages the vertical side of projections 415, when the carriage is pulled out, thus preventing the carriage from being removed from the machine without first manually raising the latches 416.

The supply roll is mounted upon a tube 420 (Figs. 20 and 27) supported at one end on a stud (not shown) in the frame 409 and at the other end on a plunger 421 inserted in the end of the tube. The plunger 421 is provided with a disk 422 and also has integral therewith a shaft 423 having secured to the other end thereof a knob 424. The shaft carried by the frame 405 is held in position by a latch 425 which engages a notch in the shaft 423 and prevents the plunger 421 from being pulled out of the tube without first manually operating the latch 425 to release the shaft 423.

The roller 242, previously described, is mounted upon a shaft 426, carried by the frame 405 and the frame 409.

The roller 243 comprises a tube made integral with disks 430 and 431 fast on a shaft 432 mounted in the frames 405 and 407. The disk 430 has on the periphery thereof and evenly spaced thereon, lugs 433, which cooperate with holes 435 (Fig. 9) in one edge of the record material. The disk 431 has on its periphery and equally spaced thereon, lugs 434, which co-operate with the holes 436 in the other edge of the record material. There are twice as many lugs 433 as there are lugs 434, thus preventing the paper from being put upon the carriage in the wrong manner and also preventing the record after being taken from the machine from being wrongly placed in the auditing machine described in the above mentioned application, Serial No. 316,528. The previously mentioned receiving roll comprises a tube 440 (Figs. 28 and 30) having flanges 441 which project within grooves 442 in a plunger 443 having integral therewith a shaft 444 mounted in the frame 405. Also integral with the plunger 443 and shaft 444 are a disk 445 and a knob 446, the knob 446 extending outside of the frame 405 and being for the purpose of drawing the plunger 443 out of the tube when putting new record material in the carriage. The shaft 444 is slotted to receive a latch 447 like the latch 425 associated with the supply roll tube 420. The disk 445 is for the purpose of aligning the paper as it is wound upon the receiving roll 440. The tube is split at 448 so that when starting the paper on said tube the paper may be inserted in the slit 448 thus preventing said paper from slipping off the tube when said tube is turned to wind the paper thereon.

The other end of the tube is provided with flanges 441, projecting into notches 442 in a plunger 443 which has integral therewith another disk 445. This disk 445 (Fig. 30) is fast on a hub 452, which also has fast thereto a smaller disk 453. The hub 452, disk 453, disk 445 and plunger 442 rotate on a stud 454, mounted in the frame 407. Loosely mounted on the hub 452 is a flanged hub 455 and a flanged hub 456 (Figs. 28 and 30) connected by a mortice and tenon 457, this connection being such that there is a slight end play for the hubs 455 and 456 between the disks 445 and 453. Secured to the hub 455 is a pinion 458 the purpose of which will be hereinafter described. Surrounding the hubs 455 and 456 is a compression spring 459, which is for the purpose of causing a friction between the disks 445 and 446 and the hubs 455 and 456. The supply roll tube 420 at one end is provided with friction hubs and a spring pressed friction mechanism like the hubs 455 and 456 and spring 459. This construction is necessary on the supply roll tube to prevent the paper from becoming loose or unwinding itself from said tube.

The means for feeding the paper from the supply roll to the receiving roll comprises, the pinion 458 which meshes with a gear 462 (Figs. 28 and 29) mounted on a stud 463 carried by the frame 407. Fast on said gear 462 is a pinion 464 meshing with a gear 465 (Fig. 31) fast on a hub 466, said hub being mounted to rotate in the frame 407. The gear 465 carries two pilot pins 467 which project into holes in disk 430. Secured to the other end of the hub 466 is a disk 468, having on its periphery six notches 469.

By means to be hereinafter described, the disk 468, during operation of the machine, is rotated clockwise (Fig. 29) thereby rotating the gear 465 and consequently the disk 430 in a clockwise direction. The pins 433 and 434 projecting into the holes 435 and 436 respectively (Fig. 9) cause the paper to be drawn from the supply roll 241 (Fig. 20) and wound upon the receiving roll 440. The gear 465 drives the pinion 464 and the gear 462 rotates gear 458 clockwise. This gear being secured to the hub 455 drives said hub and through the mortice and tenon 457 drives the hub 456 therewith. Thus through the friction between the hub 455 and disk 445 and between the disk 453 and hub 456 caused by the spring 459 the receiving roll tube 440 is rotated clockwise (Fig. 29) and winds the paper thereon. The reason for the friction drive between the tube 440 and the pinion 458 is on account of the constantly increasing diameter of the receiving roll as the paper is wound thereon. When the carriage is out of the machine means is provided for preventing the paper from moving in the carriage and this means comprises, a spring pressed pawl 470 (Figs. 28, 29, and 31), which, when the carriage is out of the machine is in the position shown in Fig. 31 whereby one end 471 engages one of the notches 469 and prevents the disk 468 from turning. The means for driving the disk 468 during operation of the machine to feed the paper between the records perforated therein comprises, two pilot pins 475 carried by the disk 468. These pins project into two of the holes 476 (Fig. 3) in a Geneva cam 477 mounted on a pilot stud 478 carried by the frame 200. When the carriage is in the machine this pilot stud 478 projects into a hole 479 (Fig. 31) in the hub 466 and the pilot pins 475 project into two diametrically opposite holes 476 in the Geneva cam 477. The Geneva cam is rotated counter-clockwise by a stud 474 carried on an arm 480, secured to a gear 481 loose on a stud 482 carried by the frame 200. The gear 481 meshes with the gear 483 loose on a stud 484 mounted in the frame 200. The gear 483 in turn meshes with a gear 485 fast on the shaft 50. A clockwise rotation of the shaft 50 (Fig. 3) through the gears 485 and 483 rotates the gear 481 and the arm 480 clockwise, whereby the pin 474 rotates the Geneva cam 477 counter-clockwise one-sixth of a revolution, there being six divisions in said cam. One-sixth of a revolution of the Geneva cam 477 through its connection with the pins 475 on the disk 468 rotates said disk clockwise (Fig. 29) one-sixth of a revolution which is sufficient to feed the record paper between the two of the record perforations thereon. When the carriage is in the machine and in position the pin 482 rocks the pawl 470 counter-clockwise (Fig. 31) thereby disengaging its portion 471 from the notch 469 and allowing the disk 468 to be driven by the Geneva cam 477.

An extra device is provided for engaging rolls 242 and 243 to prevent the paper from becoming loose as it is passing over these rolls. This means comprises, two resilient rolls 491 (Figs. 1ᴬ, 3, 8 and 20) fast on shafts 492 carried by two parallel arms 493 and 494 fast upon shafts 495 and 496 respectively. The shafts 495 and 496 are mounted in brackets 497 and 498 respectively, secured to the channel bars 412. Fast on the shafts 495 and 496 are arms 499 and 500 respectively, (Fig. 20) each being pivoted to one end of twisted links 501 and 502 respectively, (Figs. 20 and 21). The other ends of the links 501 and 502 are pivoted at 506 and 507 respectively to a disk 508 mounted on a vertical stud 509 secured to the base of the machine. The rollers 491 are held in position as shown in Fig. 20, by a spring 510 stretched between a stud secured to the link 502 and a hook fastened in the back frame 58.

When it is desired to remove the carriage from the machine it is necessary to remove the rollers 491 from the position shown in Fig. 20. This is accomplished by means of lever 511 (Figs. 1^A, 20 and 21) having one end secured to disk 508 and the other end projecting outside of the machine where it is accessible to the operator. By moving this lever 511 to the right, (Figs. 20 and 21) the disk 508 is rotated counter-clockwise thereby moving the link 502 to the right and the link 501 to the left which rocks the shaft 495 clockwise and the shaft 496 counter-clockwise thereby removing the rollers 491 from contact with the rolls 242 and 243. When the lever 511 is moved to the right the pins 506 and 507 are positioned so that the pull of the levers 501 and 502 is along lines through the studs 506, 509 and 507, urging the disk 508 in a counter clockwise direction, and therefore, the rollers will remain in disengaged position until the lever 511 is moved back into normal position by the operator.

Before the carriage can be removed from the machine, it is necessary for the operator to rock a lever 515 (Fig. 8) counter-clockwise thereby disengaging its bifurcated portion from a stud 516 carried by the side frame 200. The stud 516 projects into the frame 405 of the carriage. After releasing the lever 515 from the stud 516 the carriage may be slid out of the machine on the channel bars 411 and 412 sufficient to permit the operator to remove the record paper and replace it by a fresh roll. When the carriage is out of the machine means is provided for preventing an operation of the motor key 95 (Fig. 10) to release the motor and cause an operation of the machine. This means comprises, a yoke 517 one end of which is integral with the lever 515, the other end being integral with a cam arm 518 (Figs. 3 and 20) co-operating with a pin 519 carried by one end of a bell crank 520 mounted on a rod 521 supported by the frame 231 and the right hand frame 200 (Figs. 13 and 27). Co-operating with the upper end of the bell crank 520 is a projection 522 of an arm 523 loose on the shaft 250. Integral with the arm 523 is a yoke 524 and a forked arm 525 surrounding a pin 526 carried by an arm 527 fast on the shaft 81.

From the above description it will be clear that when the lever 515 is rocked counter-clockwise the cam arm 518 is rocked counter-clockwise (Fig. 13) thereby through the pin 519 rocking the bell crank 520 clockwise and positioning its upper end directly beneath the projection 522 of the arm 523.

From previous description it will be remembered that the depression of the motor key 95 releases the shaft 81 whereby it is rocked counterclockwise which, through the pin 526 and arm 525, rocks the arm 523 clockwise. However, if the lever 515 has been rocked to disengage itself from the stud 516 so that carriage may be drawn out of the machine and the bell crank 520 through the rocking of the lever 515, rocked so that its upper end lies beneath the projections 522 on the arm 523, then said arm cannot be rocked clockwise, and therefore the shaft 81 cannot be rocked counter-clockwise which results that the machine cannot be released.

There is also a device cooperating with the record strip which prevents operation of the machine when there is no paper in the carriage even though the carriage is in proper position in the machine. This mechanism comprises a bell crank 528 (Figs. 13 and 27) loose on the rod 521. The horizontal arm of bell crank 528 lies on the paper when there is paper in the machine; however, when there is no paper in the machine, this end of the bell crank being heavier than the vertical portion, will rock counter-clockwise thus positioning its vertical portion underneath the projection 522 of the arm 523 if the carriage is in the machine and the lever 515 in normal position as shown in Fig. 28. However, when the lever 515 is rocked to remove the carriage a pin 529 on bell crank 520 engages the vertical portion of the bell crank 528 and rocks it clockwise to the position shown in Fig. 3, the parts in this figure being shown with the carriage removed from the machine.

From this description, it can be readily seen that in order to depress the motor key to release the machine the portion 522 of the arm 523 must pass between the upper portions of the bell cranks 520 and 528. If either is beneath the portion 522 the motor key 95 will not stay depressed and will not release the machine.

*Operation.*

In describing the operation of the machine, let it be assumed that clerk "A-5" or "85" sold one article for $2.80: said article to be sent C. O. D. and that cashier "C-4" or "64" is operating the machine. The class of goods to which the article belongs is "27". The cashier first depresses the "7" key 375 and then moves the third lever 295 from the left (Fig. 1^A) downward until stopped by the pawl 383 (Fig. 3). Next the "4" key 375 is depressed and lever 296 moved downward until its pawl 383 engages bar 379 and stops the lever. Next the operator depresses the "2" key 375 and moves the lever 297 downward until it is brought to a stop. Next the "5" key 375 is depressed and the first lever 298 to the left is moved downward until its pawl 383 engages the bar 379 and causes that lever to stop. The setting of these levers first sets up the class of goods "27", the cashier "C-4" the kind of transaction, which is collect on delivery, and the clerk "A-5" who made the sale. The operator then depresses the "1" key 116 and then depresses the amount keys 115 to register $2.80. After this the motor key 95 is depressed, thereby releasing the shaft 81 (Fig. 12) and allowing the spring 75 to rock the arm 72 and raise the clutch arm 63 and release the motor clutch 62 whereby through beveled gears between said clutch and the cam shaft 50 said shaft is given one complete revolution.

The levers 295, 296, 297 and 298 through the plates 301, the levers 302 and the segments 310 secured thereto set up the slides 313 (Fig. 20) to operate the punches 319 and 320, and the type wheels 335, 336, 337 and 338 whereby the record strip is perforated and the interpretation of said perforations is printed upon said strip. These perforations and interpretations thereof classify the amount $2.80; in other words, they control the selection of the totalizers in the above mentioned Goldberg auditing machine. The movement of the above mentioned levers 295 through segments 366, levers 362, gears 360, segments 357, 356, 353 and the gears 352 position the type wheels 350 (Fig. 15) whereby the classification of the amount is printed upon the record strip shown in Fig. 1ᴮ.

The rotation of the cam shaft 50 rocks the shaft 130 (Fig. 10) and rocks the driving segments 134 first counterclockwise to carry any of the segments 125, which may have been left in any other position outside of normal to the normal position, and then drives said segments clockwise whereby through the latches 129 said segments 125 are rocked clockwise until said latches are broken by engagement of their tripping members with the shanks of the depressed keys 115 and 116, thereby causing the segments 125 to stop, whereby the amount commensurate with the value of the keys depressed is accumulated on the totalizer wheels 145 through the gears 140, 141, 143, 148 and 144.

The differential movement of the segments 125 is carried through the arms 192 and sleeves 193 to the type wheels 165 and 166 (Fig. 15) whereby the amount, which in this case is $2.80, is set upon said type wheels and an impression made therefrom upon the detail strip illustrated in Fig. 1ᴮ.

The consecutive numbering type wheels 168 are advanced one step and the consecutive number is printed in the same line with the amount and the classification which is illustrated in the top line of printing (Fig. 1ᴮ).

Before the motor key is depressed the operator inserts a slip such as illustrated in Fig. 11 on the table 530 whereby amount and quantity of goods sold, the consecutive number, the date and classification of said amount are printed at the top of said slip by the type on the underside of the type wheels 165, 166, 168, 175 and 350 by an impression from the platen 186 (Fig. 16).

The differential positioning of the segments 125 through the gears 140, sleeves 201, segments 203 and 204 differentially positions the slides 206 and 215 to control the perforation of the quantity of goods sold and the amount of the sale through the projections on said slides. Gears 251 and 253 on the type wheels 247 and 248 are set whereby a printed interpretation of said perforations is made upon said record strip. Just before the perforating and printing on the record strip said strip is advanced by means of the gears 485 and 483 and 481 which operate the arm 480 whereby its stud 481 rotates the Geneva cam 477 one-sixth of a revolution whereby its connection with the disk 468 (Fig. 8) rotates said disk and driving gears shown in Fig. 29 and turns the receiving roll 244 (Fig. 20) whereby the paper is wound upon said roll to properly space the paper from the last perforation therein to receive the perforations and printed interpretations thereof of a new transaction.

While the form of mechanism herein shown and described is admirably adapted to fulfill the objects primarily stated, it is to be understood that it is not intended to confine the invention to the one form of embodiment herein disclosed, for it is susceptible of embodiment in various forms all coming within the scope of the claims which follow.

What is claimed is:

1. In a machine of the class described, the combination of a plurality of manipulative devices, a plurality of series of punches for producing a perforated record, a plurality of slides having projections thereon for moving said punches, and means connected to said slides and said devices and moved by the devices to position the slides to select the proper punch or combination of punches to be moved.

2. In a machine of the class described, the combination of a main operating mechanism, a plurality of manipulative devices, a plurality of series of punches for producing a perforated record, a plurality of slides having projections thereon for moving said punches, means connected to said slides and said devices and moved by the devices to position the slides to select the proper punch or combination of punches to be moved, and means operated by the main operating mechanism for rocking the slides whereby said projections engage the selected punches and move them through the record material.

3. In a machine of the class described, the combination of manipulative devices adapted to be moved to any one of a plurality of positions, a plurality of series of punches for producing a perforated record, a plurality of slides having projections thereon for moving said punches, means connected to said slides and said devices and moved by the devices to position the slides to select the proper punch or combination of punches to be moved, manually operated stop bars cooperating with said devices, and means carried by said devices for engaging said bars when operated and stopping the devices in the proper position regardless of the direction of movement of said devices.

4. In a machine of the class described, the combination of manipulative devices adapted to be moved to any one of a plurality of positions, a main operating mechanism, a plurality of series of punches for producing a perforated record, a plurality of slides having projections thereon for moving said punches, means connected to said slides and said devices and moved by the devices to position the slides to select the proper punch or combination of punches to be moved, manually operated stop bars cooperating with said devices, means carried by said devices for engaging said bars when operated and stopping the devices in the proper position regardless of the direction of movement of said devices, and means operated by the main operating mechanism for rocking the slides whereby the said projections engage the selected punches and move them through the record material.

5. In a machine of the class described, the combination of manipulative devices adapted to be moved to any one of a plurality of positions, manually operated stop bars cooperating therewith, and means carried by said devices for engaging said bars when operated and stopping the devices in the proper position regardless of the direction of movement of said devices.

6. In a machine of the class described, the combination of manipulative devices adapted to be moved to any one of a plurality of positions, manually operated stop bars having notches therein, and means carried by said devices and normally registering with said notches and adapted to engage an operated bar and stop an operated device in the proper position regardless of the direction of movement of said operated device.

7. In a machine of the class described, the combination of manipulative devices adapted to be moved to any one of a plurality of positions, manually operated stop bars cooperating therewith, a movable member carried by each of said devices, stop pins for limiting the movement of said members when the member is moved by its engagement with an operated stop bar during the setting of its respective manipulative device thereby stopping the said device in the proper position.

8. In a machine of the class described, the combination of manipulative devices adapted to be moved to any one of a plurality of positions, slidable stop bars arranged at right angles to said devices, notches in each bar, means carried by said devices and normally in alignment with said notches, and keys for moving said bars to move the notches out of alignment with said means whereby said means engages the unbroken portion of a moved bar and stops the operated device in the proper position regardless of the direction and movement of the device.

9. In a machine of the class described, the combination of a main operating mechanism, releasing mechanism therefor, a plurality of series of punches for producing a perforated record, slidable carriage for carrying record material, a member for locking the carriage in the proper position in the machine, and means for cooperating with said releasing mechanism and said member and operated by said member, when the member is moved to unlock the carriage, to prevent operation of the releasing mechanism.

10. In a machine of the class described, the combination of a main operating mechanism, releasing mechanism therefor, a plurality of series of punches for producing a perforated record, a slidable carriage for carrying record material, a member for locking the carriage in the proper position in the machine, means cooperating with said releasing mechanism and said member and operated by said member, when the member is moved to unlock the carriage to prevent operation of the releasing mechanism, and other means cooperating with said releasing mechanism and the record material whereby the releasing mechanism is rendered inoperative when there is no record material in the carriage even though the carriage be locked in the proper position.

11. In a machine of the class described, the combination of a main operating mechanism, a plurality of series of punches for producing a perforated record, a slidable carriage for carrying record material, means operated by the main operating mechanism for feeding the record material when the carriage is in operative position, and means operable upon a removal of the carriage out of position for causing said feeding means to be disengaged from the main operating mechanism and to be locked against movement to feed the paper.

12. In a machine of the class described, the combination of a main operating mechanism, a plurality of series of punches for producing a perforated record, a slidable carriage for carrying record material, means operated by the main operating mechanism for feeding said record material when the carriage is in operative position, removal of the carriage out of position to cause said feeding means to be disengaged from the main operating mechanism, and means carried by said carriage and operated by the removal thereof to lock the feeding mechanism against movement.

13. In a machine of the class described, the combination of a normally locked record producing mechanism, release mechanism therefor, a removable carriage carrying record material, means for locking the carriage in the proper position, a rockable member operated by the releasing mechanism, and a device operated by the locking means, when said means is moved to unlock the carriage, to engage said rockable member to prevent the operation of the releasing mechanism.

14. In a machine of the class described, the combination of a normally locked record producing mechanism, releasing mechanism therefor, a removable carriage carrying record material, means for locking the carriage in the proper position, a rockable member operated by the releasing mechanism, a device operated by the locking means when said means is moved to unlock the carriage to engage said rockable member to prevent operation of the releasing mechanism, said device and said locking means so located that said rocking member must pass between them in order that the releasing mechanism may be operated.

15. In a machine of the class described, the combination of record producing mechanism, a carriage carrying record material having adjacent one edge thereof a row of perforations and adjacent the other edge a row of twice as many perforations, and means carried by the carriage for preventing the record material from being wrongly placed thereon.

16. In a machine of the class described. the combination of record producing mechanism, a carriage carrying record material having adjacent one edge thereof a row of perforations and adjacent the other edge a row of twice as many perforations, and means carried by the carriage and adapted to engage said perforations whereby the record material is prevented from being wrongly placed on said carriage.

17. In a machine of the class described, the combination of record producing mechanism, a carriage carrying record material having adjacent one edge thereof a row of perforations and adjacent the other edge a row of twice as many perforations, and two rows of lugs carried by the carriage, one row having twice as many as the other row thus preventing the record material from being wrongly placed on the carriage.

18. In a machine of the class described, the combination of manipulative amount determining devices, differentially movable members cooperating therewith, actuators therefor, a plurality of series of punches for producing a perforated record, a plurality of slides having projections thereon for moving the punches, and means connecting the differentially movable members and the slides whereby the slides are positioned so that their projections will select the punch or combination of punches commensurate with the value of the operated devices.

19. In a machine of the class described, the combination of a plurality of depressible keys, a main operating mechanism, differentially movable members, actuators therefor, a plurality of series of punches for producing a perforated record, a plurality of slides having projections thereon for moving the punches, means connecting the differential members and the slides to position the slides whereby their projections select the proper punch or combination of punches commensurate with the value of the key depressed, and means operated by the main operating mechanism to rock the slides, after they have been positioned to move the punches through the record material.

20. In a perforating machine, a plurality of punches, a hammer cooperating therewith to operate the same, and means on the hammer for aligning said hammer and punches.

21. In a perforating machine, a plurality of punches, a slidable hammer adapted to be slid to select different combinations of punches for operation, and a guiding web on said hammer cooperating with said punches to keep the hammer and punches in operative alinement.

22. In a perforating machine, a plurality of punches, a slidable hammer adapted to be slid to select different combinations of punches for operation, and means on said hammer and punches for alining said hammer and punches.

23. In a machine of the class described, the combination of a plurality of manipulative devices, a plurality of series of punches for producing a perforated record, a plurality of slides having projections thereon for moving said punches, differential mechanism under control of said devices, and means connected to said slides and said mechanism and moved by the mechanism to position the slides to select the proper punch or combination of punches to be moved.

24. In a machine of the class described, the combination of a main operating mechanism, a plurality of manipulative devices, differential mechanism controlled thereby, a plurality of series of punches for producing a perforated record, a plurality of slides having projections thereon for moving said punches, means connected to said slides and said mechanism and moved by the mechanism to position the slides to select the proper punch or combination of punches to be moved, and means operated by the main operating mechanism for rocking the slides whereby said projections engage the selected punches and move them through the record material.

25. In a perforating machine, a plurality of punches, a plurality of actuating means therefor, and manipulative means for adjusting each actuating means to operate one or more punches during an operation of the machine.

26. In a perforating machine, a set of punches, means for actuating said punches, a single manipulative means for controlling said actuating means for operating various combinations of punches.

27. In a perforating machine, a set of punches adapted to be operated in various combinations to record the digits one to nine, a bank of keys corresponding to said digits, and differentially movable means for operating said punches under control of said keys.

In testimony whereof I affix my signature.

MAXIMILIAN M. GOLDBERG.